US012147919B2

(12) United States Patent
Chuang et al.

(10) Patent No.: US 12,147,919 B2
(45) Date of Patent: *Nov. 19, 2024

(54) SYSTEM AND INTERFACES FOR MANAGING TEMPORARY WORKERS

(71) Applicant: Scout Exchange LLC, Boston, MA (US)

(72) Inventors: John Chuang, Brookline, MA (US); Ken Lazarus, Concord, MA (US); Sean Bisceglia, Boston, MA (US); Mouli Ramani, Boston, MA (US)

(73) Assignee: Scout Exchange LLC, Boston, MA (US)

( * ) Notice: Subject to any disclaimer, the term of this patent is extended or adjusted under 35 U.S.C. 154(b) by 250 days.

This patent is subject to a terminal disclaimer.

(21) Appl. No.: 17/733,045

(22) Filed: Apr. 29, 2022

(65) Prior Publication Data

US 2022/0261734 A1    Aug. 18, 2022

Related U.S. Application Data

(63) Continuation of application No. 16/878,156, filed on May 19, 2020, now Pat. No. 11,321,645, which is a (Continued)

(51) Int. Cl.
*G06Q 10/06* (2023.01)
*G06Q 10/0631* (2023.01)
(Continued)

(52) U.S. Cl.
CPC ........... *G06Q 10/063112* (2013.01); *G06Q 10/06311* (2013.01); *G06Q 10/063114* (2013.01);
(Continued)

(58) Field of Classification Search
None
See application file for complete search history.

(56) References Cited

U.S. PATENT DOCUMENTS 7,509,672 B1    3/2009  Horwitz et al.
7,783,541 B1    8/2010  Rolf
(Continued)

FOREIGN PATENT DOCUMENTS

CA      2 657 495 A1    9/2009
CN      101512594 A     8/2009
(Continued)

OTHER PUBLICATIONS

Chinese Office Action dated Mar. 31, 2023, in connection with Chinese Application No. 201880025119.0.
(Continued)

*Primary Examiner* — Fateh M Obaid
(74) *Attorney, Agent, or Firm* — Wolf, Greenfield & Sacks, P.C.

(57) ABSTRACT

Described herein are embodiments of a system that permits various entities (e.g., hiring, staffing, and client computer systems and/or devices) involved in the placement of a candidate to a job to interact systematically to carry out functions that conventional systems are unable to perform. These functions may, for example, include synchronizing systems of different entities involved in placing a worker, effectively tracking a temporary workers during a placement and/or hiring process, and post placement activities. To this end, systems and method are provided that permit a handshake process between disparate systems to complete a candidate placement process, timesheet approval and processing, consolidated invoicing, customized analytics and
(Continued)

reporting, supplier onboarding of temporary workers, and post-hiring tracking, among other novel tools, interfaces and functionality.

20 Claims, 26 Drawing Sheets

Related U.S. Application Data continuation of application No. 15/895,984, filed on Feb. 13, 2018, now Pat. No. 10,664,775.

(60) Provisional application No. 62/458,528, filed on Feb. 13, 2017.

(51) Int. Cl.
| | |
|---|---|
| *G06Q 10/10* | (2023.01) |
| *G06Q 10/1053* | (2023.01) |
| *G06Q 10/109* | (2023.01) |
| *G06Q 10/1091* | (2023.01) |
| *G06Q 20/10* | (2012.01) |
| *G06Q 40/12* | (2023.01) |
| *G06F 3/04842* | (2022.01) |
| *G06F 8/38* | (2018.01) |

(52) U.S. Cl.
CPC ......... *G06Q 10/10* (2013.01); *G06Q 10/1053* (2013.01); *G06Q 10/109* (2013.01); *G06Q 10/1091* (2013.01); *G06Q 20/102* (2013.01); *G06Q 40/12* (2013.12); *G06F 3/04842* (2013.01); *G06F 8/38* (2013.01)

(56) References Cited

U.S. PATENT DOCUMENTS

| | | | |
|---|---|---|---|
| 8,103,679 B1 | 1/2012 | Cranfill et al. | |
| 9,405,799 B1* | 8/2016 | Kapoor | G06Q 10/1053 |
| 10,147,072 B2 | 12/2018 | Chuang et al. | |
| 10,664,775 B2 | 5/2020 | Chuang et al. | |
| 11,093,900 B1* | 8/2021 | Benjamin | G06Q 10/1053 |
| 11,321,645 B2 | 5/2022 | Chuang et al. | |
| 11,410,131 B2 | 8/2022 | Chuang et al. | |
| 2002/0010614 A1* | 1/2002 | Arrowood | G06Q 10/06375 705/7.37 |
| 2003/0037032 A1* | 2/2003 | Neece | G06Q 30/02 |
| 2004/0230452 A1 | 11/2004 | Abe et al. | |
| 2004/0267595 A1 | 12/2004 | Woodings et al. | |
| 2005/0267793 A1 | 12/2005 | Campbell et al. | |
| 2007/0021982 A1* | 1/2007 | Sun | G06Q 10/06 705/2 |
| 2007/0033064 A1 | 2/2007 | Abrahamsohn | |
| 2007/0094109 A1* | 4/2007 | Perry | G06Q 10/109 705/32 |
| 2007/0288308 A1* | 12/2007 | Chen | G06Q 30/0254 705/14.52 |
| 2008/0027783 A1 | 1/2008 | Hughes et al. | |
| 2008/0059523 A1 | 3/2008 | Schmidt et al. | |
| 2008/0065441 A1 | 3/2008 | Langmack et al. | |
| 2008/0140430 A1 | 6/2008 | Hyder et al. | |
| 2009/0083235 A1 | 3/2009 | Joao | |
| 2009/0089124 A1 | 4/2009 | Henderson et al. | |
| 2009/0094239 A1 | 4/2009 | Sabol et al. | |
| 2009/0125353 A1 | 5/2009 | Bullock et al. | |
| 2009/0125443 A1 | 5/2009 | Lappin et al. | |
| 2009/0177518 A1 | 7/2009 | Adams et al. | |
| 2009/0216680 A1 | 8/2009 | McCown et al. | |
| 2009/0287514 A1 | 11/2009 | West | |
| 2009/0299829 A1* | 12/2009 | Fraser | G06Q 10/1053 705/7.14 |
| 2010/0030595 A1* | 2/2010 | Day | G06Q 10/063 705/319 |
| 2010/0169143 A1* | 7/2010 | Carr | G06Q 10/10 715/845 |
| 2010/0185551 A1 | 7/2010 | Ganesh et al. | |
| 2010/0211516 A1 | 8/2010 | Andrekovich et al. | |
| 2011/0125622 A1* | 5/2011 | McCrea | G06Q 30/04 705/32 |
| 2011/0137816 A1 | 6/2011 | Kornblum et al. | |
| 2011/0208664 A1 | 8/2011 | Rahman | |
| 2011/0276506 A1* | 11/2011 | Schmitt | G06Q 30/0241 705/321 |
| 2011/0276631 A1 | 11/2011 | Schmitt | |
| 2012/0089432 A1* | 4/2012 | Podgurny | G06Q 10/06311 705/7.13 |
| 2012/0109837 A1 | 5/2012 | Sahagun et al. | |
| 2012/0185402 A1 | 7/2012 | Lajoie | |
| 2012/0215578 A1* | 8/2012 | Swierz, III | G06Q 50/205 705/7.14 |
| 2012/0239585 A1 | 9/2012 | Bailey | |
| 2013/0013443 A1 | 1/2013 | Christie | |
| 2013/0036065 A1 | 2/2013 | Chen et al. | |
| 2013/0036066 A1 | 2/2013 | Telahun | |
| 2013/0046704 A1 | 2/2013 | Patwa et al. | |
| 2013/0166465 A1 | 6/2013 | Barros et al. | |
| 2013/0262175 A1 | 10/2013 | Deshpande et al. | |
| 2013/0275193 A1 | 10/2013 | Chuang | |
| 2013/0275321 A1 | 10/2013 | Chuang | |
| 2013/0275322 A1 | 10/2013 | Chuang | |
| 2013/0275323 A1 | 10/2013 | Chuang | |
| 2013/0282605 A1* | 10/2013 | Noelting | G06Q 10/10 705/321 |
| 2014/0188768 A1 | 7/2014 | Bonissone et al. | |
| 2014/0207698 A1 | 7/2014 | Geisse et al. | |
| 2014/0244333 A1 | 8/2014 | Bournas | |
| 2014/0337242 A1 | 11/2014 | Bailey et al. | |
| 2014/0358810 A1* | 12/2014 | Hardtke | G06Q 10/105 705/321 |
| 2015/0112765 A1 | 4/2015 | Sundaresh et al. | |
| 2015/0186846 A1 | 7/2015 | Menon et al. | |
| 2015/0242781 A1 | 8/2015 | Mancuso et al. | |
| 2015/0317602 A1 | 11/2015 | Rao et al. | |
| 2016/0027991 A1* | 1/2016 | Suzuki | H01L 27/20 600/447 |
| 2016/0140528 A1* | 5/2016 | Shaaban | G06F 17/40 705/34 |
| 2016/0300190 A1 | 10/2016 | Moran | |
| 2017/0024410 A1 | 1/2017 | Pola | |
| 2017/0069036 A1 | 3/2017 | Shaaban et al. | |
| 2017/0109834 A1* | 4/2017 | Shaaban | G06Q 40/12 |
| 2017/0243152 A1 | 8/2017 | Thomson et al. | |
| 2017/0357943 A1* | 12/2017 | Tiner | G06Q 10/1053 |
| 2017/0357945 A1 | 12/2017 | Ashkenazi et al. | |
| 2018/0232683 A1 | 8/2018 | Chuang et al. | |
| 2018/0232684 A1 | 8/2018 | Chuang et al. | |
| 2018/0232703 A1* | 8/2018 | Chuang | G06Q 40/12 |
| 2019/0220748 A1 | 7/2019 | Denil et al. | |
| 2019/0244176 A1 | 8/2019 | Chuang et al. | |
| 2019/0385125 A1* | 12/2019 | Blakely | G06Q 10/1053 |
| 2020/0104800 A1* | 4/2020 | Oliynyk | G06Q 10/063114 |
| 2020/0226532 A1 | 7/2020 | Lazarus et al. | |
| 2021/0103875 A1 | 4/2021 | Chuang et al. | |
| 2023/0021978 A1 | 1/2023 | Oliynyk et al. | |
| 2024/0013156 A1 | 1/2024 | Chuang et al. | |

FOREIGN PATENT DOCUMENTS

| | | |
|---|---|---|
| CN | 104966179 A | 10/2015 |
| EP | 3 163 525 A1 | 5/2017 |
| EP | 3 734 523 A1 | 11/2020 |
| GB | 2558032 A | 7/2018 |
| JP | 2002-024459 A | 1/2002 |
| JP | 2002-288325 A | 10/2002 |
| JP | 2004-192224 A | 7/2004 |
| JP | 2005-222168 A | 8/2005 |
| JP | 2005-275991 A | 10/2005 |
| JP | 2006-185409 A | 7/2006 |
| JP | 2009-075690 A | 4/2009 |
| JP | 2011-517354 A | 6/2011 |
| JP | 2015-501024 A | 1/2015 |

(56) References Cited

FOREIGN PATENT DOCUMENTS

| KR | 10-0571718 B1 | 4/2006 |
| WO | WO 2001/09772 A1 | 2/2001 |
| WO | WO 2002/46884 A2 | 6/2002 |
| WO | WO 2006/132759 A2 | 12/2006 |
| WO | WO 2008/121171 A1 | 10/2008 |
| WO | WO 2009/108445 A | 9/2009 |
| WO | WO 2013/052769 A1 | 4/2013 |
| WO | WO 2018/223235 A1 | 12/2018 |

OTHER PUBLICATIONS

Luk et al., Web-Service Based Human Resource Recruitment by Using Matchmaking Decision Support. 10th IEEE. 2006. 8 pages.

Invitation to Pay Additional Fees from corresponding International Application No. PCT/US2012/058904 mailed Dec. 6, 2012.

International Search Report and Written Opinion from corresponding International Application No. PCT/US2012/058904 mailed Feb. 8, 2013.

International Preliminary Report on Patentability from corresponding International Application No. PCT/US2012/058904 mailed Apr. 17, 2014.

International Search Report and Written Opinion mailed Apr. 25, 2018, in connection with International Application No. PCT/US2018/018028.

Invitation to Pay Additional Fees mailed Dec. 3, 2019, in connection with International Application No. PCT/US2019/053626.

International Search Report and Written Opinion mailed Jan. 31, 2020, in connection with International Application No. PCT/US2019/053626.

International Search Report and Written Opinion mailed Mar. 4, 2020, in connection with International Application No. PCT/US2019/065674.

International Preliminary Report on Patentability mailed Apr. 8, 2021, in connection with International Application No. PCT/US2019/053626.

International Preliminary Report on Patentability mailed Jun. 24, 2021, in connection with International Application No. PCT/US2019/065674.

Summons to Attend Oral Proceedings mailed Aug. 2, 2019, in connection with European Application No. EP 12838881.6.

Extended European Search Report from corresponding European Application No. EP 12838881.6 mailed Mar. 5, 2015.

Extended European Search Report mailed Jul. 9, 2020, in connection with European Application No. 20159615.2.

European Communication mailed Oct. 14, 2020, in connection with European Application No. 18707550.2.

Extended European Search Report mailed Feb. 8, 2022, in connection with European Application No. 19867864.1.

Extended European Search Report mailed Apr. 14, 2022, in connection with European Application No. 19896657.4.

Examination Report mailed Apr. 14, 2022, in connection with Australian Application No. AU2018217898.

Brownlee, Difference Between Classification and Regression in Machine Learning. Dec. 11, 2017. [retrieved Mar. 17, 2022] retrieved from the Internet <URL: https://web.archive.org/web20180702024525/https://machinelearningmastery.com/classification-versus-regression-in-machine-learning/.

Collins, Best practices for avoiding duplicate candidate submissions to job orders by recruiters? Jul. 2007 [retrieved Jan. 23, 2013] retrieved from the Internet <URL: http://www.linkedin.com/answers/hiring-human-resources/staffing-recruiting/HRH_SFF/62429-1275612>.

Cullens, Fishing where the fish are. National Apartment Associate, Nov. 2006.

Singh et al., Prospect: A System for Screening Candidates for Recruitment. CIKM '10. Oct. 26-30, 2010:659-668.

Zwilling, 10 Questions for Selecting a Recruiter to Attract the Best Talent to Your Business Team. Sep. 11, 2011 https://www.inc.com/martin-zwilling/how-to-find-best-hire-for-that-key-role-in-your-new-venture.html. p. 1-6.

Wolf, Recruiting 101. T+D. Association for Talent Development. Apr. 2014; 18.

Canadian Office Action dated Jun. 20, 2023, in connection with Canadian Application No. 3,126,535.

European Examination Report dated Feb. 9, 2023, in connection with European Application No. 19896657.4.

Canadian Office Action dated Oct. 17, 2022, in connection with Canadian Application No. 3,126,535.

Australian Examination Report dated Sep. 23, 2022, in connection with Australian Application No. 2018217898.

Canadian Examiner's Report dated Oct. 19, 2023, in connection with Canadian Application No. 3,053,371.

Canadian Examiners Report dated Apr. 3, 2024, in connection with Canadian Application No. 3,126,535.

Chinese Notice of Allowance dated Apr. 11, 2024, in connection with Chinese Application No. 2018800251190.

European Examination Report dated Jan. 26, 2023, in connection with European Application No. 20 159 615.2-1218.

\* cited by examiner

FIG. 9

Job Information ✎

Requisition Type
Contingent

* Job Title
Telco Line Runner

* Location
Boston Massachusetts

Bill Rate Range
$50.00-$100.00

Pay Rate Range

* Target Start Date
December 4, 2017 (Monday)

* Target End Date
Aug 31, 2018 (Friday)

Duration
39 Weeks

No. of Positions
16

* Exemption Status
Non-Exempt

Recruiter *(not visible to staffing firm)*

Hiring Manager
*(not visible to staffing firm)*
Chris Babbacus Scout

GL Code
1234-5678

Show Job Description

---

Listing Details

Filling out this section helps search firms find the qualified candidates much faster!

Open to Bid
☐ Bids outside of the listed bill rate range are allowed

What is the urgency of this job?    Minimum Education Requirements

[Looking for just the right candidate ▼]    [Bachelor's Degree ▼]

What are the expected hours per week?
[    ]

Please check all boxes that apply to this listing.
☐ Overtime is allowed.    ☐ Work hours are flexible
☐ There is a possibility to work remotely    ☑ Contingent to Permanent position
☐ This assignment could be extended To whom does this position report?
[                    ]

What are the 3-4 non-negotiable requirements of this position?
[                    ]

What are the nice-to-have skills?
[                    ]

*900* scout connect | Scout Marketplace | My saved jobs [0] | My submitted jobs [14] | Karen D. ▼ | feedback | help

1000

Submit Candidate      Save job ○ ○ ○

Centene     Contingent:   Bill Rate: $90.00-$120.00/hr
PILOT - CONTRACT COORDINATOR     Duration: 13 Weeks (Target 1/30/17-4/28 17)
Boston, Massachusetts     Posted 7 days ago | Non-Exempt | Open to bid

* First Name        * Last Name

[joe]        [Candidate]

* Candidate Email   Why?

[kdillard+tcandidate@goscountgo.com]

* Resume
Only pdf, doc, and docx files accepted
[Choose file] Resume Nov 2016.docx

* Bill Rate    Pay Rate    Mark-up

[$ 95]    [$ 70]    35.7%

"Pay Rate" and "Markup Percent" will NOT be shown to the Contracting Company. These values are used to:

* Confirm the Pay Rate and Markup Percent are within allowable range, if one has been set by the Contracting Company.
* Calculate the Scout Fee

FIG. 10

Contingent Worker Placement Form

Step 1: Recruiter review of Worker placement details

You → Hiring Company → Complete

* Review the following details and fill in all known information.
* Click the Complete Review button to send the form to the hiring company for their review.
* If any information is incorrect please click the link below to report any errors to Scout.
* If the company makes any changes to the fields, the form will be sent back to you for a final verification.

Contingent Worker Placement Details

* Worker Name
Tom Menino

* Company Name
Scout Demo Company

* Worker's Email Address  Why?
kdillard+tom@goscoutgo.com

* Confirm Email Address
kdillard+tom@goscoutgo.com

* Job Title
DEMO - Care Manager

* Req ID
DEMO - Care Manager

Work Location
* Address Line 1 (street)

FIG. 13A

1300 scout

Contingent Worker Placement Form

Step 2: Hiring company review of Worker placement details

Recruiter → You → Complete

* The recruiter has completed their review of the candidate placement details
* If any of the required information is incorrect, replace it with the correct information.
* Fill in any fields that were left blank.
* If you change the Exempt Status or Assignment Dates, the form will be sent back to the recruiter for a final verification.
* If any information is incorrect, please click the link below to report any errors to Scout.

Contingent Worker Placement Details

* Worker Name
Tom Menino

* Company Name
Scout Demo Comany

* Worker's Email Address  Why?
kdillard+tom@goscoutgo.com

* Confirm Email Address
kdillard+tom@goscoutgo.com

* Job Title
DEMO - Care Manager

* Req ID
DEMO - Care Manager

Work Location
* Address Line 1 (street)
235 Main Street

Hiring Manager Information
* Name
Robert McDonald

* Email Address
rmcdonald@goscoutgo.com

Department

Timesheet Approver
* Name
Robert McDonald

* Email Address
rmcdonald@goscoutgo.com

Hiring Company Information
The information below is optional and for your internal use only. It will not be shared with the staffing firm recruiter.

GL Code
DEMO 123

Division and Cost Center

Hiring Manager: Robert Tappan Morris

← DRAFT August 14 - August 20 →

| Date | Day | Time In | Time Out | | Hours |
|---|---|---|---|---|---|
| 14 | Sunday | -:-- PM/AM | -:-- PM/AM | x | 0:00 |
| 15 | Monday | 8:01 PM/AM | 12:41 PM/AM | x | 8:00 (OT) 0:45 |
|  |  | 12:38 PM/AM | 5:10 PM/AM | x |  |
| 16 | Tuesday | 7:57 PM/AM | 12:00 PM/AM | x | 8:00 (OT) 3:58 |
|  |  | 12:30 PM/AM | 5:14 PM/AM | x |  |
|  |  | 6:03 PM/AM | 9:12 PM/AM | x |  |
| 17 | Wednesday | 10:07 PM/AM | 4:15 PM/AM | x | 6:08 |
| 18 | Thursday | 8:00 PM/AM | 12:00 PM/AM | x | 8:00 |
|  |  | 1:00 PM/AM | 5:00 PM/AM | x |  |
| 19 | Friday | 8:00 PM/AM | 12:00 PM/AM | x | 8:00 |
|  |  | 1:00 PM/AM | 5:00 PM/AM | x |  |
| 20 | Saturday | -:-- PM/AM | -:-- PM/AM |  | 0:00 |

Regular: 40.00
Overtime: 4:43
Dougle Time: 0:00
Total: 44.43

Submit Timesheet

*FIG. 14A*

| | | | | |
|---|---|---|---|---|
| scout  Martha Dunbar  Sign out ⟵1410 | | | | |
| Timesheets | | | | |
| Jenny T.<br>Software Engineer<br>ID 745592766626288646 | Week of Nov 28, 2016 | 9 Hours | Reject | Approve |
| Jenny T.<br>Software Engineer<br>ID 745554786987802629 | Week of Nov 7, 2016 | | | Not Submitted |
| Jenny T.<br>Software Engineer<br>ID 745554786987802629 | Week of Nov 14, 2016 | | | Not Submitted |
| Jenny T.<br>Software Engineer<br>ID 745554786987802629 | Week of Oct 31, 2016 | 32.75 Hours | | Rejected |
| Jenny T.<br>Software Engineer<br>ID 745554786987802629 | Week of Nov 28, 2016 | 15 Hours | | Approved |
| Jenny T.<br>Software Engineer<br>ID 745554786987802629 | Week of Oct 3, 2016 | 41.5 Hours | | Approved |

FIG. 14B

SYSTEM AND INTERFACES FOR MANAGING TEMPORARY WORKERS

RELATED APPLICATIONS

This application is a Continuation of U.S. application Ser. No. 16/878,156, filed May 19, 2020, entitled "SYSTEM AND INTERFACES FOR MANAGING TEMPORARY WORKERS", which is a Continuation of U.S. application Ser. No. 15/895,984, filed Feb. 13, 2018, entitled "SYSTEM AND INTERFACES FOR MANAGING TEMPORARY WORKERS", which is a Non-Provisional of Provisional (35 USC 119(e)) of U.S. Application Ser. No. 62/458,528, filed Feb. 13, 2017, entitled "SYSTEM AND INTERFACES FOR MANAGING TEMPORARY WORKERS". The entire contents of these applications are incorporated herein by reference in their entirety.

NOTICE OF MATERIAL SUBJECT TO COPYRIGHT PROTECTION

Portions of the material in this patent document are subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF INVENTION

Hiring companies and staffing companies may utilize computer systems to manage candidates and applicants for open jobs. For example, a hiring company may utilize an applicant tracking system (ATS) to handle various recruitment activities. The staffing company may use a separate staffing platform (e.g., a separate ATS) to manage candidates and recruitment activities. Further, after placement of a candidate, a hiring company and staffing firm may carry out other interactions as part of placing a candidate to a job. For example, the hiring company may pay a staffing firm a percentage of a worker's salary after the worker begins employment with the hiring company.

SUMMARY

Systems and software exist that are used to manage hiring, reviews, payroll and performance of workers. Also, there exist systems for recruiting and tracking applicants by hiring professionals such as recruiters. However, according to one aspect, it is appreciated that existing capabilities for managing and tracking workers across multiple different entities are not sufficient, as the managing and tracking may involve coordination between the multiple different computer and software systems. Different parties associated with hiring a candidate for an open job may each use a separate computer system(s) and separate software application(s). The various computer systems and software applications are unable to interact with each other. Given the large volume of job requisition, candidate, and worker records that are to be stored, updated, and tracked, the inability of the different computer systems and software applications to interact leaves these computer systems and software applications unable to carry out several functions associated with hiring activities.

The inventors have recognized a need for a system and associated interfaces that permit various entities (e.g., hiring, staffing, and client computer systems and/or devices) involved in the placement of a candidate to interact systematically to carry out functions that conventional systems are unable to carry out. For instance, it is appreciated that there may be various functions for effectively coordinating between multiple computer systems for placement of temporary workers among a number of employers and sites. These functions may, for example, include synchronizing systems of different entities involved in placing a worker, effectively tracking a temporary workers during a placement and/or hiring process, tracking payment of temporary workers, and tracking performance of temporary workers after placement, distributing payments to parties involved in placement of a worker. To this end, systems and method are provided that permit a handshake process between systems, timesheet approval and processing, consolidated invoicing for temporary workers, customized analytics and reporting, supplier onboarding of temporary workers, and post-hiring tracking, among other novel tools, interfaces and functionality.

According to some embodiments, systems involve components that integrate functions performed by computer systems and/or software applications used by employers, staffing firms, and various service delivery consultants. Certain components integrate and consolidate workflows between such entities to perform placements of workers to a client, complete onboarding requirements, process timesheets, perform invoicing and reporting functions, among other functions and operations. According to various aspects, workflows are optimized and the number of steps are reduced. Further, reporting and tracking capabilities for temporary workers may be facilitated by a system that spans the employer, staffing and placement firm computer systems.

According to another aspect, a marketplace for temporary workers and open positions may be created that has greater capabilities than current systems. For instance, a system may be provided that collects multiple contingent jobs from one or more employers, and tracks applicants from multiple staffing firms that otherwise would reside in disparate computer systems and applications. The system may include employer interfaces used to allow employers to view available talent from various staffing firms and to pull placements for temporary positions available at the employer site. The employer may be provided a number of tools that permit the employer to view timesheets and approve them, generate and review reports, review invoices, track payments to staffing firms, among other functions. Some aspects may be facilitated by a talent platform exchange system that facilitates communication between computer systems used by employers, recruiters and staffing agencies.

According to one aspect of the present invention, a distributed computer system is provided comprising an exchange component, functionally coupled to a plurality of staffing computer systems and a client-based management system, the exchange component configured to maintain a plurality of temporary worker records, each of which is associated with a temporary worker from a pool of temporary workers available to be placed, an interface to the client-based management system, the interface configured to accept a job requisition record indicating a requisition for a temporary worker for an identified client, responsive to receipt of the job requisition record, submitting an indication of the job requisition record to the plurality of staffing computer systems, receive a plurality of candidate records from the plurality of staffing computer systems, identify the plurality of candidate records to the client-based management system to be displayed to a user, determining a placement of a selected candidate based on an indication received from the user; and responsive to the indication, perform, by the exchange component, an onboarding of the selected candidate within the client-based management system.

According to one embodiment, the system further comprises a component adapted to, after the selected candidate is placed, store timesheet data associated with the placed candidate. According to another embodiment, the system further comprises a client interface component adapted to permit the user to review the stored timesheet data associated with the placed candidate. According to another embodiment, the exchange component stores the timesheet data associated with the placed candidate.

According to another embodiment, the interface to the client-based management system is a programmatic interface implemented in an employee management system. According to another embodiment, the exchange component further comprises a component adapted to generate an invoice to the client based on the stored timesheet data. According to another embodiment, the exchange component includes a payment component adapted to automatically pay a staffing firm associated with the placed candidate responsive to a receipt of payment from the client.

According to another embodiment, the exchange component is further configured to perform a search function among the pool of temporary workers for a match between the job requisition record and at least one of the plurality of temporary worker records. According to another embodiment, the exchange component is adapted to create a job requisition record at the plurality of staffing computer systems through a programmatic interface. According to another embodiment, the created job requisition record is active to a selected number of the plurality of staffing computer systems for a predetermined period of time.

According to another embodiment, the system further comprises an interface that permits a user to view the plurality of temporary worker records, each of which is associated with a temporary worker from a pool of temporary workers available to be placed. According to another embodiment, the system further comprises an indication of a recruiter associated with at least one of the temporary worker records, the indication of the recruiter including at least one performance parameter of the associated recruiter.

According to another embodiment, the component adapted to generate an invoice to the client based on the stored timesheet data further comprises a component to permit the client to retrieve timesheet data responsive to a selection of a control input. According to another embodiment, the control input includes a link within a representation of the invoice. According to another embodiment, the system further comprises an interface that permits a user to view a temporary worker placement interface, the placement interface including parameters associated with a temporary position and an indication of an assigned temporary worker.

According to another aspect of the present invention, a non-volatile computer-readable medium encoded with instructions for execution on a computer system is provided, the instructions when executed, provide a system comprising an exchange component, functionally coupled to a plurality of staffing computer systems and a client-based management system, the exchange component configured to maintain a plurality of temporary worker records, each of which is associated with a temporary worker from a pool of temporary workers available to be placed, an interface to the client-based management system, the interface configured to accept a job requisition record indicating a requisition for a temporary worker for an identified client, responsive to receipt of the job requisition record, submitting an indication of the job requisition record to the plurality of staffing computer systems, receive a plurality of candidate records from the plurality of staffing computer systems, identify the plurality of candidate records to the client-based management system to be displayed to a user, determining a placement of a selected candidate based on an indication received from the user; and responsive to the indication, perform, by the exchange component, an onboarding of the selected candidate within the client-based management system.

According to one embodiment, the system further comprises a component adapted to, after the selected candidate is placed, store timesheet data associated with the placed candidate. According to another embodiment, the system further comprises a client interface component adapted to permit the user to review the stored timesheet data associated with the placed candidate. According to another embodiment, the exchange component stores the timesheet data associated with the placed candidate.

According to another embodiment, the interface to the client-based management system is a programmatic interface implemented in an employee management system. According to another embodiment, the exchange component further comprises a component adapted to generate an invoice to the client based on the stored timesheet data. According to another embodiment, the exchange component includes a payment component adapted to automatically pay a staffing firm associated with the placed candidate responsive to a receipt of payment from the client.

According to another embodiment, the exchange component is further configured to perform a search function among the pool of temporary workers for a match between the job requisition record and at least one of the plurality of temporary worker records. According to another embodiment, the exchange component is adapted to create a job requisition record at the plurality of staffing computer systems through a programmatic interface. According to another embodiment, the created job requisition record is active to a selected number of the plurality of staffing computer systems for a predetermined period of time.

According to another embodiment, the system further comprises an interface that permits a user to view the plurality of temporary worker records, each of which is associated with a temporary worker from a pool of temporary workers available to be placed. According to another embodiment, the system further comprises an indication of a recruiter associated with at least one of the temporary worker records, the indication of the recruiter including at least one performance parameter of the associated recruiter.

According to another embodiment, the component adapted to generate an invoice to the client based on the stored timesheet data further comprises a component to permit the client to retrieve timesheet data responsive to a selection of a control input. According to another embodiment, the control input includes a link within a representation of the invoice. According to another embodiment, the system further comprises an interface that permits a user to view a temporary worker placement interface, the placement interface including parameters associated with a temporary position and an indication of an assigned temporary worker.

According to one aspect of the present invention, a distributed computer system is provided. The system comprises a network interface, a database, and an exchange component couple to an employer computer system and a staffing firm computer system via the network interface, the exchange system configured to: store, in the database, a plurality of job requisition records, each of the plurality of job requisition records associated with one of a plurality of job requisitions, synchronize the plurality of job requisition records with a dataset of one or more job requisitions stored by the employer computer system, the synchronizing comprising: identifying, in the dataset of the one or more job requisition stored by the employer computer system, a new job requisition that is not among the plurality of job requisitions, and generating a new job requisition record in the database, wherein the new job requisition record is associated with the new job requisition, provide access to the new job requisition record to the staffing firm computer system, maintain a pool of temporary worker records in the database, each of the temporary worker records associated with one of a plurality of temporary workers available as candidates, and match a temporary worker of the plurality of temporary workers to the new job requisition.

According to one embodiment, the exchange component is coupled to an application tracking system (ATS) used by the employer computer system. According to another embodiment, the exchange component is further configured to: in response to matching the temporary worker to the new job requisition, transmit information about the temporary worker to the employer computer system from a respective one of the plurality of temporary worker records associated with the temporary worker.

According to another embodiment, the exchange component is further configured to receive, via the network interface, an indication that the temporary worker has been hired from the employer computer system. According to one embodiment, the exchange component is further configured to: in response to receiving the indication that the temporary worker has been hired from the employer computer system: transmit, via the network interface, an indication to the staffing computer system indicating that the temporary worker has been hired, receive, via the network interface, an indication of acceptance from the staffing computer system, transmit, via the network interface, an indication of the acceptance from the staffing computer system to the employer computer system, receive, via the network interface, an indication of completion of a hiring process from the employer computer system, and store, in the database, information specifying placement of the temporary worker to the job requisition.

According to another embodiment, providing access to the new job requisition record to the staffing computer system comprises generating a user interface allowing a user of the staffing computer system to submit a candidate for the new job requisition. According to one embodiment, the exchange component is further configured to: receive, via the user interface, a submission of the temporary worker for the new job requisition, and match the temporary worker to the new job requisition in response receiving to the submission. According to one embodiment, the exchange component is further configured to receive the indication of the update to the candidate status from the employer computer system in response to a change in a candidate status in an applicant tracking system (ATS) used by the employer computer system.

According to another embodiment, the exchange component is further configured to: determine one or more staffing firms to recommend the new job requisition to, wherein the one or more staffing firms include a staffing firm associated with the staffing firm computer system, and transmit an indication of the new job requisition to the staffing firm computer system in response to determining the one or more staffing firms. According to one embodiment, the exchange component is further configured to, generate a user interface allowing a user to select the one or more staffing firms to recommend the new job requisition to, receive a user selection of the one or more staffing firms via the user interface, and determine the one or more staffing firms based on the received user selection.

According to another embodiment, the exchange component is further configured to maintain, in the database, a candidate status in a temporary worker record associated with the temporary worker when the temporary worker is matched to the new job requisition record. According to one embodiment the exchange component is further configured to: receive an indication of an update to the candidate status from the employer computer system, and update the candidate status for the temporary worker in the database in response to receiving the indication of the update to the candidate status.

Another to another aspect of the present invention, a computer implemented method for integrating an employer computer system and a staffing firm computer system is provided. The method comprises: storing, in a database, a plurality of job requisition records, each of the plurality of job requisition records associated with one of a plurality of job requisitions, synchronizing the plurality of job requisition records with a dataset of one or more job requisitions stored by the employer computer system, the synchronizing comprising: identifying, in the dataset of the one or more job requisition stored by the employer computer system, a new job requisition that is not among the plurality of job requisitions, and generating a new job requisition record in the database, wherein the new job requisition is associated with the new job requisition, providing access to the new job requisition record to the staffing firm computer system, maintaining a pool of temporary worker records in the database, each of the temporary worker records associated with one of a plurality of temporary workers available as candidates, and matching a temporary worker of the plurality of temporary workers to the new job requisition.

According to another embodiment, the method further comprises receiving, via a network interface, an indication that the temporary worker has been hired from the employer computer system. According to one embodiment, the method further comprises, in response to receiving the indication that the temporary worker has been hired from the employer computer system: transmitting, via the network interface, an indication to the staffing computer system indicating that the temporary worker has been hired, receiving, via the network interface, an indication of acceptance from the staffing computer system, transmitting, via the network interface, an indication of the acceptance from the staffing computer system to the employer computer system, receiving, via the network interface, an indication of completion of a hiring process from the employer computer system, and storing, in the database, information specifying placement of the temporary worker to the job requisition.

According to another embodiment, the method further comprises providing access to the new job requisition record to the staffing computer system comprises generating a user interface allowing a user of the staffing computer system to submit a candidate for the new job requisition. According to one embodiment, the method further comprises receiving, via the user interface, a submission of the temporary worker to the new job requisition, and matching the temporary worker from the pool of the plurality of temporary workers in response receiving to the submission.

According to another embodiment, the method further comprises determining one or more staffing firms to recommend the new job requisition to, wherein the one or more staffing firms include a staffing firm associated with the staffing firm computer system, and transmitting an indication of the new job requisition to the staffing firm computer system in response to determining the one or more staffing firms. According to one embodiment, the method further comprises generating a user interface allowing a user to select the one or more staffing firms to recommend the new job requisition to, receiving a user selection of the one or more staffing firms, and determining the one or more staffing firms based on the received user selection.

According to another aspect of the present invention, a non-volatile computer-readable medium encoded with instructions for execution on a computer system is provided. The instructions, when executed by the computer system, cause the computer system to perform a method comprising: storing, in a database, a plurality of job requisition records, each of the plurality of job requisition records associated with one of a plurality of job requisitions, synchronizing the plurality of job requisition records with a dataset of one or more job requisitions stored by the employer computer system, the synchronizing comprising: identifying, in the dataset of the one or more job requisition stored by the employer computer system, a new job requisition that is not among the plurality of job requisitions, and generating a new job requisition record in the database, wherein the new job requisition is associated with the new job requisition, providing access to the new job requisition record to the staffing firm computer system, maintaining a pool of temporary worker records in the database, each of the temporary worker records associated with one of a plurality of temporary workers available as candidates, and matching a temporary worker of the plurality of temporary workers to the new job requisition.

According to one embodiment, the method further comprises, in response to matching the temporary worker to the new job requisition, transmitting information about the temporary worker to the employer computer system from one of the plurality of temporary worker records associated with the temporary worker.

According to one aspect of the present invention, a distributed system is provided. The distributed computer system comprises: a network interface, a database, and an exchange component coupled to an employer computer system and a staffing firm computer system via the network interface, wherein the exchange component is further configured to: receive, via the network interface, a first indication of a candidate being hired for a job requisition from the employer computer system, in response to receiving the first indication of the candidate being hired from the employer computer system, transmitting, via the network interface, a second indication of the candidate being hired to the staffing firm computer system, receive, via the network interface, a third indication that a placement of the candidate to the job requisition is complete from the employer computer system, and in response to receiving the indication that the placement of the candidate is complete: store, in the database, a record of a worker associated with the hired candidate, and store, in the database, a record of an approver associated with a user of the employer computer system.

According to another embodiment, the exchange component is further configured to receive the first indication of the candidate being hired for the job requisition responsive to a status associated with the candidate in an applicant tracking system (ATS) used by the employer computer system changing to hired.

According to another embodiment, the exchange component is further coupled to a client system used by the hired candidate via the network interface. According to one embodiment, the exchange component is further configured to receive an indication of a submitted timesheet from the client system. According to one embodiment, the exchange component is further configured to transmit an indication of the submitted timesheet to the user of the employer computer system. According to one embodiment, the exchange component is further configured to: receive an indication of approval of the timesheet by the user of the employer computer system from the employer computer system, and store the approved timesheet in the database. According to one embodiment, the exchange component is further configured to: receive, via the network interface, an indication of a rejection of the timesheet by the user of the employer computer system from the employer computer system, and transmit, via the network interface, an indication of the rejected timesheet to the client system used by the hired candidate.

According to another embodiment, the exchange component is further configured to generate an invoice based on the submitted timesheet. According to one embodiment, the exchange component is further configured to transmit, via the network interface, the invoice to an automatic payment system used by the employer computer system. According to one embodiment, the exchange component is further configured to: receive, via the network interface, a payment from the employer computer system in response to transmitting the invoice, and transmit, via the network interface, funds to an account of a staffing firm associated with the staffing firm computer system.

According to another aspect of the present invention, a computer implemented method of integrating an employer computer system and a staffing firm computer system is provided. The method comprises: receiving, via a network interface, a first indication of a candidate being hired for a job requisition from the employer computer system, in response to receiving the first indication of the candidate being hired from the employer computer system, transmitting, via the network interface, a second indication of the candidate being hired to the staffing firm computer system, receiving, via the network interface, a third indication that a placement of the candidate to the job requisition is complete from the employer computer system, and in response to receiving the indication that the placement of the candidate is complete: storing, in a database, a record of a worker associated with the hired candidate, and storing, in the database, a record of an approver associated with a user of the employer computer system.

According to another embodiment, the method further comprises receiving, via the network interface, an indication of a submitted timesheet from a client system used by the hired candidate. According to one embodiment, the method further comprises transmitting, via the network interface, an indication of the submitted timesheet to the user of the employer computer system. According to one embodiment, the method further comprises receiving, via the network interface, an indication of approval of the timesheet by the user of the employer computer system from the employer computer system, and storing the approved timesheet in the database. According to one embodiment, the method further comprises receiving, via the network interface, an indication of a rejection of the timesheet by the user of the employer computer system from the employer computer system, and transmitting, via the network interface, an indication of the rejected timesheet to the client system used by the hired candidate.

According to another embodiment, the method further comprises generating an invoice based on the submitted timesheet. According to one embodiment, the method further comprises transmitting, via the network interface, the invoice to an automatic payment system used by the employer computer system. According to one embodiment, the method further comprises receiving, via the network interface, a payment from the employer computer system in response to transmitting the invoice, and transmitting, via the network interface, funds to an account of a staffing firm associated with the staffing firm computer system.

According to another aspect of the present invention, a non-volatile computer-readable medium encoded with instructions for execution on a computer system is provided. The instructions, when executed, cause the computer system to perform a method comprising: receiving, via a network interface, a first indication of a candidate being hired for a job requisition from the employer computer system, in response to receiving the first indication of the candidate being hired from the employer computer system, transmitting, via the network interface, a second indication of the candidate being hired to the staffing firm computer system, receiving, via the network interface, a third indication that a placement of the candidate to the job requisition is complete from the employer computer system, and in response to receiving the indication that the placement of the candidate is complete: storing, in a database, a record of a worker associated with the hired candidate, and storing, in the database, a record of an approver associated with a user of the employer computer system.

According to another embodiment, the method further comprises receiving, via the network interface, an indication of a submitted timesheet from a client system used by the hired candidate.

Still other aspects, examples, and advantages of these exemplary aspects and examples, are discussed in detail below. Moreover, it is to be understood that both the foregoing information and the following detailed description are merely illustrative examples of various aspects and examples, and are intended to provide an overview or framework for understanding the nature and character of the claimed aspects and examples. Any example disclosed herein may be combined with any other example in any manner consistent with at least one of the objects, aims, and needs disclosed herein, and references to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. The appearances of such terms herein are not necessarily all referring to the same example.

BRIEF DESCRIPTION OF DRAWINGS

Various aspects of at least one example are discussed below with reference to the accompanying figures, which are not intended to be drawn to scale. The figures are included to provide an illustration and a further understanding of the various aspects and examples, and are incorporated in and constitute a part of this specification, but are not intended as a definition of the limits of a particular example. The drawings, together with the remainder of the specification, serve to explain principles and operations of the described and claimed aspects and examples. In the figures, each identical or nearly identical component that is illustrated in various figures is represented by a like numeral. For purposes of clarity, not every component may be labeled in every figure. In the figures:

FIG. 9 shows an example user interface screen for submitting a job requisition according to various embodiments of the present invention;

FIG. 10 shows an example user interface screen for submitting a candidate according to various embodiments of the present invention;

FIGS. 13A-B show example user interface screens for placing a candidate to a job according to various embodiments of the present invention;

FIGS. 14A-B show example user interface screens for submitting and approving timesheets according to various embodiments of the present invention.

DETAILED DESCRIPTION

Figure 1:
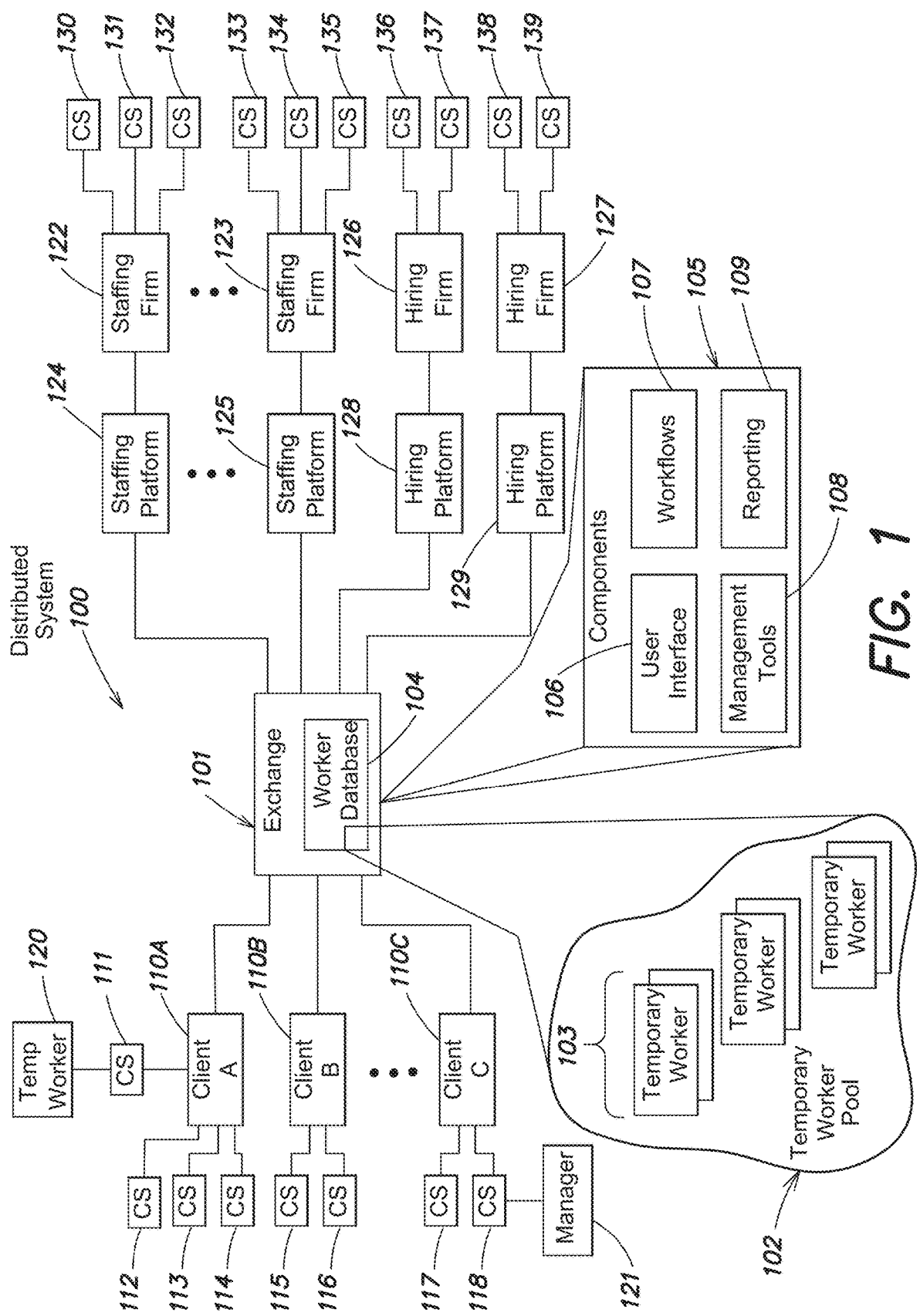
FIG. 1 shows a block diagram of a distributed computer system capable of implementing various aspects of the present invention.

Described herein are embodiments of a system that integrates different computer systems involved in placement of candidates. For example, the system may centralize storage of worker data records such that computer systems of different entities (e.g., hiring company, recruiter) may access the worker data records. A worker record may, for example, include identification information for the worker, a unique identifier for the worker in the central database, qualifications of the worker, salary requirements of the worker, location preference for the worker, and other information about the worker.

According to some embodiments, the system may include an interface to multiple different computer systems. For example, the system may include an interface to a client based computer system via which the system may receive job requisition records for jobs that a company needs workers for. The system may further include an interface with computer systems used by staffing entities (e.g., recruiters, staffing companies). In response to receiving a job requisition record from a client computer system, the system may submit an indication of the job requisition record to a staffing computer system. The system may, for example, transmit the indication of the job requisition record via the interface to the staffing computer system. In some embodiments the system may further receive candidate records from a staffing computer systems (e.g., via the interface with the staffing computer system). The system may provide access to these candidate records to a client computer system(s) (e.g., of one or more hiring companies). According to some embodiments, the system may further identify specific candidate records to display to a user of the client computer system(s).

According to some embodiments, the system may further determine a placement of a selected candidate. For example, the system may receive, via the interface to the client based computer system, an indication of a candidate being placed to a job requisition. The system may store the placement of the candidate to the job requisition in a central database of the system. In some embodiments, in response to receiving the indication, the system may further perform an onboarding function(s) associated with the placement of the candidate. The onboarding functions may involve interaction between a computer system of a candidate, a computer system of a company member (e.g., a manager), a computer system of a hiring company, and/or a computer system of a staffing company. According to some embodiments, the system may interact with a plurality of computer systems to perform or facilitate performance of onboarding functions. These onboarding functions may include, for example, completing a placement handshake between a hiring company, a staffing entity, and/or a hired worker.

The inventors have recognized and appreciated various technical challenges to managing candidate, worker, and job requisition records across multiple different computer systems that employ disparate software applications. Different parties involved in placing a candidate to an open job may each use a separate computer system(s) as well separate software application(s). Given the inability of these systems to interact with each other, the computer systems and software applications are unable to carry out several functions associated with candidate placement (e.g., completing a placement handshake).

The inventors have recognized and appreciated that conventional systems (e.g., different computer systems and different software applications) used by multiple entities involved in the hiring process are unable to interact with each other. In one instance, (1) a company looking to fill an open job may use a hiring computer system employing a first software application to manage candidate records and job requisition records, (2) a recruiter may use a staffing computer system employing a second software application to manage candidates and job requisition records, and (3) a prospective worker may use a client device to search for and apply to open jobs. Managing placement of a worker to an open job may require coordination between the company, recruiter, and prospective worker systems to store, track, and update a job requisition record(s) and/or candidate record(s) throughout a hiring process. Further, in order to place a worker to a job requisition, it may require the systems to coordinate in order to update a candidate placement process across all the systems.

The inventors have recognized and appreciated a need for a system that enables the various computer systems and/or applications to interact with each other. Enabling such interaction may allow performance of functions that were not previously performable by conventional computer systems and applications employed by entities involved in candidate placement (e.g., company, recruiter, and/or prospective worker). Such a system may allow a recruiter, using a first computer system and software application, to submit a candidate to a job requisition in a second computer system and software application used by a hiring company. The system may further provide real time candidate tracking and record updating that cannot be performed by the first and second computer systems. Further, such a system may complete placement of a candidate to a job by allowing the different systems to complete a handshake process.

The inventors have recognized and appreciated that a system that allows interaction between disparate computer systems and software applications may further enable performance of functions after a candidate is placed. For example, a hiring company, a worker, and recruiter who places the worker at the hiring company may need to interact for various post hiring activities. Such activities may include performing a handshake between multiple computer systems used by parties to complete a candidate placement process. By integrating the disparate computer systems and software applications used by the multiple entities, the system may enable performance of the post placement functions. Further, post placement activities may also include collecting data related to a worker's performance from an employer and/or worker computer system and using the data to automatically distribute funds to a staffing firm (e.g., a recruiter).

The inventors have also recognized that the disparate computer systems and software applications used by multiple different entities are unable to access, track, and update information in each of the computer systems. For example, each of a hiring company may manage its record of candidates in the hiring company's computer system while a recruiter may concurrently manage a separate record of the candidate in the recruiter's computer system. While conventional systems may each separately store, track, and update data records associated with candidate placement and jobs, the inventors have appreciated a need for a system that can integrate the computer systems to allow for keeping a central data set, and for more quickly updating and tracking data records in the other computer systems. This provides a computer system that is more accurate in maintaining candidate records, job records, and other information. Further, the system may reduce the amount of storage and computation required by each of the staffing and employer computer systems to maintain and update records.

Described below are various embodiments of an exchange system that integrates multiple disparate computer systems. The exchange system may enable performance of, and perform various functions associated with placement of candidates and completion of candidate placement. The exchange system may further provide storage capabilities that provide the disparate computer systems access to information that would otherwise be unavailable to the computer systems. It should be appreciated that while specific embodiments are described, those embodiments are illustrative to aid in understanding the principles described herein, and that other embodiments are possible. Embodiments are not limited to operating in accordance with any of the example set out below.

According to one implementation, a system is provided that is capable of storing and presenting within a management interface complex relationships between entities. For instance, it is appreciated that there may be complex relationships between assets such as network communication equipment, servers, desktops, applications and other assets. Further, it is appreciated that it may be helpful to record and visualize various functional aspects that these particular assets provide.

According to some embodiments, the system may comprise a distributed computer system that includes a network interface, database, and an exchange component. The exchange component may be coupled to one or more employer computer systems and one or more staffing computer systems via the network interface. The exchange component may store one or more job requisition records associated with one or more respective job requisition. A job requisition may comprise information specifying an open job position and/or a need for a worker to fill a position. The exchange component may synchronize the stored requisition records with a dataset of job requisitions stored by an employer computer system. For example, the employer system may use an application (e.g., an ATS) to store job requisitions for job positions that the employer needs to fill. The exchange component may sync the stored job requisition records with the job requisitions stored by the application of the employer computer system.

According to some embodiments, to synchronize the job requisition records, the exchange component may identify a new job requisition stored by the employer computer system for which the exchange component has not previously stored a job requisition record. In this case exchange component may generate a new job requisition record in the database associated with the new job requisition. The exchange component may store information about the new job requisition in the newly generated record (e.g., skill requirement information, start date, location, salary, term of employment). The exchange component may further provide access to the new job requisition record to a staffing computer system. For example, the exchange component may transmit an indication of the staffing computer system of the new job requisition record.

In some embodiments, the exchange component may maintain a pool of temporary worker records in a database of the system. The exchange component may maintain, in the pool, a temporary worker record for each of multiple temporary workers who are available as candidates for a job requisition (e.g., the new job requisition). The exchange component may match a temporary worker to the new job requisition. When the exchange component matches the temporary worker, the exchange component may transmit information about the worker from a temporary worker record associated with the worker to the employer computer system (e.g., an ATS used by the employer computer system).

In some embodiments, the exchange component may generate a user interface that allows a user of the staffing computer system to view the new job requisition record and submit candidates for the new job requisition. The exchange component may receive, via the user interface, a submission of the temporary worker for the new job requisition. In some embodiments, the exchange component may match the temporary worker to the new job requisition when the submission of the temporary worker is received from the staffing computer system.

In some embodiments, the exchange component may further determine one or more staffing firms to recommend the new job requisition to. For example, the exchange component may determine to recommend the new job requisition to a staffing firm associated with a staffing computer system that the exchange component is coupled to. The exchange component may transmit an indication of the new job requisition to the staffing computer system when it determines the one or more staffing firms to which the new job requisition is to be recommended. In some embodiments, the exchange component may generate a user interface via which a user may select the one or more staffing firms. The exchange component receives a user selection of the selected staffing firms via the user interface. The exchange component may determine to recommend the new job requisition to the one or more staffing firms based on the received user selection.

In some embodiments, the exchange component may further interact with the employer computer system to receive status updates about a submitted candidate. In one embodiment, the exchange component may receive an indication that the temporary worker submitted for the new job requisition has been hired from the employer computer system (e.g., from an ATS). In some embodiments, when the exchange component receives such an indication, the exchange component may perform a placement process (e.g., a handshake) between the employer computer system and the staffing computer system.

According to some embodiments, the system may additionally or alternatively allow interaction between disparate computer systems to perform functions after placement of a candidate (e.g., after the hired candidate begins work at an employer). In some embodiments, the exchange component may receive an indication from the employer computer system that a candidate has been hired (e.g., from an ATS used by the employer computer system). In response, the exchange component may transmit an indication of the candidate hiring to the staffing computer system. The exchange component may further receive an indication from the employer computer system indicating that the candidate placement is complete. When the exchange component receives an indication that the candidate placement is complete, the exchange component may store, in the database, (1) a record of a worker associated with the hired candidate, and (2) a record of an approver associated with a user of the employer computer system. The approver may, for example, be a supervisor, hiring manager, or other user associated with the employer.

In some embodiments, the exchange component may further be coupled via the network interface to a client computer system used by the hired candidate. The exchange component may receive an indication of a timesheet submission of the hired candidate from the client computer system. The exchange component may, for example, receive timesheet data and store the timesheet data in a database of the system. In some embodiments, the exchange component may generate a user interface through which the hired candidate can enter a record of time worked, date(s) worked, tasks worked and other information regarding work done by the hired candidate. The user interface may, for example, comprise a timesheet in which the user may enter the information.

In some embodiments, when the exchange component receives the indication of the timesheet submission from the hired candidate (e.g., a user of the client computer system), the exchange component may transmit an indication of the submitted timesheet to the user of the employer computer system (e.g., a manager). The exchange component may allow the user of the employment computer system to review the timesheet. For example, the exchange component may generate a user interface via which the user can approve the timesheet, reject the timesheet, and/or request editing of the timesheet by the hired candidate. In one case, the exchange component may receive an indication of approval of the timesheet by the manager (e.g., via the user interface). In this case the exchange component may store the approved timesheet. In another case, the exchange component may also receive an indication of a rejection of the timesheet by the manager. In this case, the exchange component may transmit an indication of the rejected timesheet to the client computer system used by the hired candidate. The hired candidate may then edit and/or resubmit the timesheet.

In some embodiments, the exchange component may further generate an invoice based on a submitted timesheet. For example, after a submitted timesheet is approved and stored in the database, the exchange component may use information from the timesheet to generate an invoice. In some embodiments, the exchange component may further submit the generated invoice to an automated repayment (AR) system used by the employer computer system. The exchange component may, in response to submitting the invoice to the AR system, receive payment from the employer computer system. The exchange component may then transmit funds to one or more other entities involved in the hiring of the candidate such as a staffing firm, and/or a manager of the exchange system. In some embodiments, the exchange component may automatically transmit funds to a bank account of an entity (e.g., a staffing firm).

FIG. 1 shows a block diagram of a distributed computer system 100 capable of implementing various aspects of the present invention. In particular, distributed system 100 includes an exchange system 101 that integrates multiple disparate computer systems and facilitates management functions with respect to the placement, tracking and management of workers (e.g., temporary workers) among a number of different clients (e.g., client A (110A), client B (110B), and client C (110C)). Generally, users may access a management program through a client application that is executed on one or more computer systems (e.g., CS 111-118, CS 130-139, etc.). End systems may be, for example, a desktop computer system, mobile device, tablet or any other computer system having a display.

Although systems and techniques of embodiments are discussed herein with reference to temporary workers, the systems and techniques are not limited in this respect. For example, the systems and techniques can be adapted for use with other types of worker, as embodiments are not limited in this respect. For example, the systems and techniques can be adapted for placement of permanent hired workers.

Various aspects of the present invention relate to the distributed computer system and interfaces through which the user can interact with the system to facilitate the placement, tracking and payment to temporary workers. To this end, the client application may include one or more interfaces through which users access the distributed system to perform various functions. The distributed system includes components located among a number of systems to facilitate various management functions.

According to some embodiments, the exchange system 101 may provide functionality to users based on a type of the user. As the exchange system 101 integrates multiple different parties involved in a candidate placement process (e.g., staffing firm, hiring firm, worker), there are multiple different types of users that access functionality provided by the exchange system 101. Some different types of users may include, for example, a hiring manager, a prospective temporary worker, a recruiter, a hired worker, and other types of users. The exchange system 101 may provide different users with different capabilities (e.g., functions and user interfaces).

For example, there may be a number of different types of interfaces that users associated with different roles can use to manage temporary staffing functions. For instance, one or more interfaces may be operable by a client, such as a hiring manager 121 associated with particular company. According to some embodiments, the exchange system 101 may provide one or more interfaces associated with managing client functionality associated with the placement, management and pay of temporary workers to the hiring manager 121. To this end, one or more users such as a manager (e.g., manager 121) may operate a computer system interface (e.g., computer system 118) to perform one or more functions, such as placing a worker, approving timesheets, reviewing and authorizing the payment of invoices, among other functions. In another example, a worker may operate a computer system interface (e.g., computer system 111) to perform functions such as creating timesheets, editing timesheets, and/or submitting timesheets.

A timesheet may comprise any record of work performed by a worker. For example, the timesheet may include an amount of time worked by the worker, dates worked by the worker, an identification of the worker, and/or any other information. A timesheet, as used herein, may comprise a timecard, work record, clock card, work log, time chart, or any other record of work. Embodiments are not limited to a specific type or format of the record of work. Embodiments described herein may be adapted for various types of records used by different systems.

In some embodiments, the exchange system 101 may include one or more elements such as a worker database 104. The worker database 104 may store data records associated prospective workers, hired workers, and past workers. In some embodiments, the exchange system 101 may further organize worker records into pools of workers in the database 104. For example, exchange system may store, in the database 104, a plurality of temporary worker records (e.g., worker record 103) associated with temporary worker pool 102. According to some embodiments, the exchange system 101 enables multiple different entities to create, store, and/or update worker records in the database 104. The exchange system 101 may include interfaces that allows disparate computer systems associated with different entities to access the database. For example, temporary workers may be defined within the database by one or more entities including, but not limited to, recruiters, staffing firms, hiring firms, or other entities associated with managing temporary workers. Accordingly, the exchange system 101 may provide a centralized location where worker records may be stored. Multiple staffing firms can access the records via respective staffing platforms of the staffing firms. Without such a system, each entity may independently store worker records on separate systems without providing other parties (e.g., hiring firms) access to many worker records. Thus the exchange system 101 may reduce the amount of storage required of the various staffing computer systems.

According to one embodiment, exchange system 101 includes a plurality of components, each associated with performing various functions associated with managing temporary workers. For instance, exchange 101 may include user interface components 106, workflow components 107, management tools 108, and reporting tools 109. As discussed, user interface components 106 may generate and/or include one or more user interfaces defined for various roles associated with placing, managing, and compensating temporary workers (e.g., for a manager role). Workflow components 107 may include one or more defined processes that define communications between multiple computer systems such as client systems, applicant tracking systems (ATS), hiring platforms, or other systems. Management tools 108 may include one or more tools used to configure and control various processes and parameters associated with exchange 101. Reporting tools 109 may include one or more components used to generate invoices, view temporary worker pools, view reports regarding recruiters and other roles, among other reporting functions.

According to some embodiments, the exchange system 101 may further integrate multiple different computer systems associated with different parties involved in candidate placement. In some embodiments, the exchange system 101 may be connected to a number of different staffing platforms (e.g., staffing platform 124, staffing platform 125, etc.), hiring platforms (e.g., hiring platform 128, hiring platform 129, etc.), and other systems. Staffing platforms may be operated by respective staffing firms (e.g., staffing from 122, staffing firm 123), which in turn, may authorize one or more computer systems (e.g., computer systems 130-135) to access records associated with workers (e.g., temporary worker records) provided by exchange system 101. Similarly, hiring firms and their users may also perform functions with exchange system 101 using one or more computer systems (e.g., computer systems 136-139).

In some embodiments, the exchange system 101 may match a worker from the stored pool of workers 102 to a job record. In one embodiment, a user of a staffing firm computer system (e.g., staffing platform 124) may submit a candidate to a job. The job may, for example, have been submitted by a hiring firm using 126 using hiring platform 128. In some embodiments, the candidate submitted to the job may correspond to a worker stored in worker pool 102 in the worker database 104. When the staffing firm user submits the candidate to the job, the exchange system 101 may submit the stored worker to the job. In one embodiment, the exchange system 101 may match a worker record in the pool 102 to a stored job record. For example, the exchange system 101 may store a mapping of the worker record to a job record in a database of the exchange system 101. In this manner, the exchange system 101 may allow staffing firm computer systems to utilize the worker database 104 to manage submission of candidates.

In some embodiments, the exchange system 101 may associate a pool of worker records to a staffing firm. For example, the exchange system 101 may associate the temporary worker pool 102 with the staffing firm 122. The exchange system 101 may then limit access to the worker records stored in pool 102 to staffing firm 122. For example, the exchange system 101 may allow only staffing firm platform 124 associated with staffing firm 122 to edit the worker record, submit a worker in the pool 102 to a job, search for the worker in the worker database 104, and perform other tasks associated with workers in the worker pool 102. In this manner, the exchange system 101 may store worker records for workers associated with a plurality of different staffing firms (e.g., staffing firms 122-123) while still separating access of a staffing firm to those workers whom are associated with the staffing firm (e.g., workers previously submitted by the staffing firm).

The inventors have appreciated that maintaining a worker database 104 and/or pools of worker records, the exchange system 101 may make a candidate placement process more efficient to perform across the computer systems. For example, the exchange system 101 may map a stored worker record to a job requisition rather than requiring a submission of the candidate to a staffing firm computer system, and then again to an employer computer system. By, contrast, conventional systems may require multiple submissions of a worker or candidate in multiple different computer systems (e.g., staffing and employer computer systems), and storage of the submitted worker in the multiple systems. Further, any one of the disparate computer systems would be unable to match a stored worker to a job requisition submitted by a separate system. Accordingly, the exchange system 101, unlike convention systems, integrates the multiple different computer systems and allows for matching of workers and/or candidates to jobs by the exchange system 101. The exchange system 101 may reduce an amount of storage required across multiple different computer systems to store worker records, and more efficiently match a worker to a job requisition.

According to some embodiments, the exchange system 101 may include an interface to one or more of the computer systems with which it interacts. For example, the exchange system 101 may include an interface with a staffing platform (s) (e.g., staffing platform 124-125), a hiring platform (e.g., hiring platforms 128-129), and client system(s) (e.g., client systems 110A-C). In one example, an interface with a respect computer system may comprise an application program interface (API). The API may provide an interface by which the exchange system 101 may interact with the computer system. The API may include software code for accessing data from the computer system and/or transmitting data to the computer system. The software code may include various functions that, when executed, gather data from the computer system and/or transmit data to the computer system. The API may further include software code, that when executed by the computer system, may allow the computer system to interact with the exchange system 101. For example, an API for a staffing platform may include functions that allow a recruiter using the staffing platform to submit candidates to a database of candidates stored by the exchange system 101. Similarly, an API for a hiring platform (e.g., an ATS) may include functions that allow the hiring platform to access information stored by the exchange system 101 (e.g., candidate records). In another example, the exchange system 101 may include an API to interact with a client computer system of a company. The API may include software code that, when executed, allows the exchange system 101 to retrieve and/or receive data from the client computer system. Similarly, the API may include software code, that when executed, allows the exchange system 101 to transmit data to the client computer system.

Further, according to some embodiments, the exchange system 101 may provide capabilities that permit a worker (e.g., temporary worker 120) to perform one or more actions associated with a candidacy and placement of the worker. For instance, once placed, a temporary worker 120 associated with client A (110A) may be permitted to view a timesheet, edit timesheets, view pay information, or other actions associated with a temporary employment term of the worker.

Figure 2:
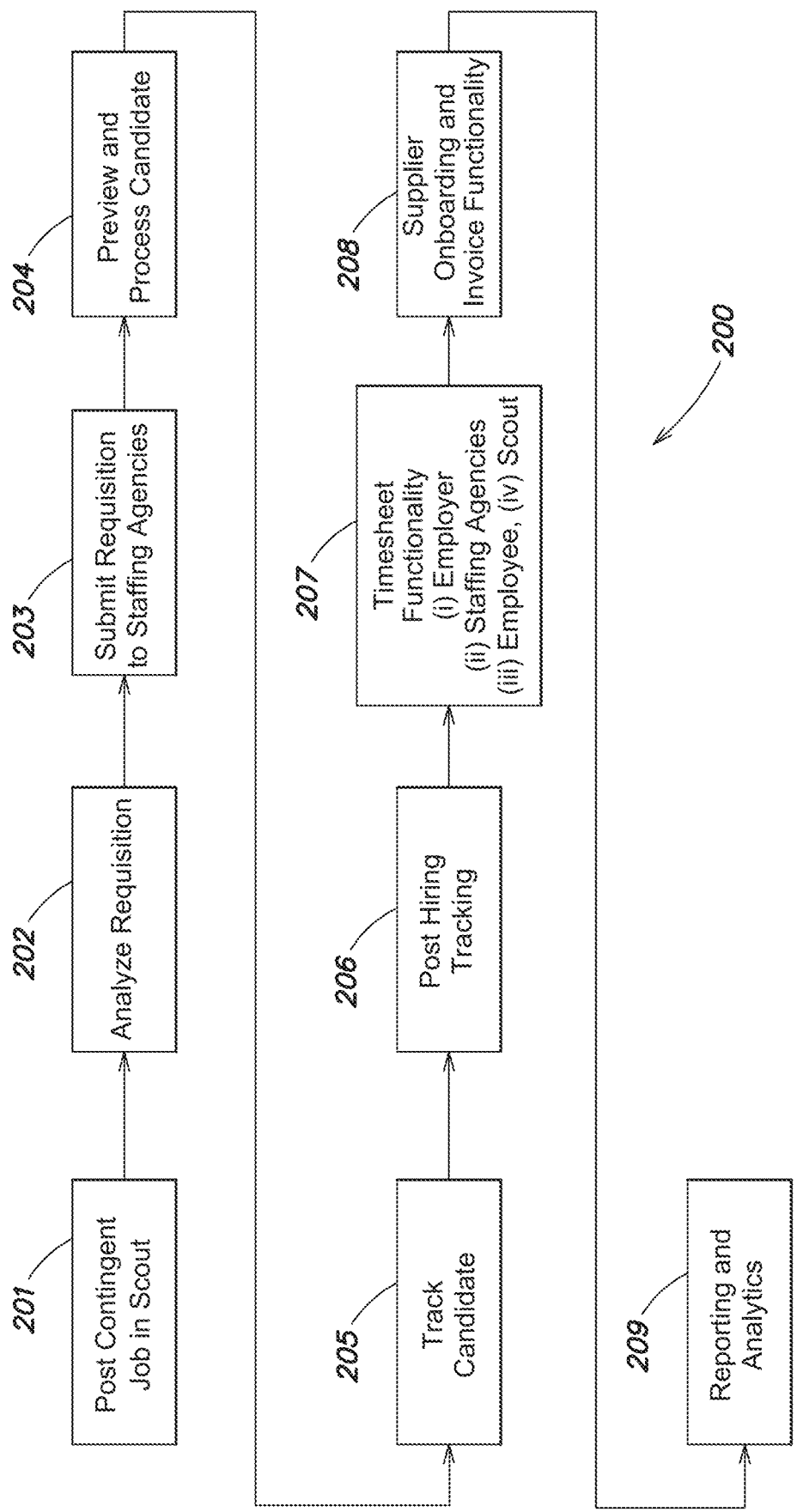
FIG. 2 shows an example process for processing temporary workers according to one embodiment of the present invention.

FIG. 2 shows an example process 200 for processing candidates and/or workers (e.g., temporary workers) according to one embodiment of the present invention. Process 200 may, for example, be executed by exchange system 101 described above with reference to FIG. 1. According to various embodiments described herein, the exchange may be referred to interchangeably as a scout exchange, or simply scout.

Process 200 begins at block 201, in which an employer posts a job requisition (e.g., of a contingent job) within an exchange interface. According to some embodiments, the employer may access an interface provided by the exchange system. The employer may, for example, access an exchange interface through a client system associated with employer (e.g., Client A 110A in FIG. 1) using a computer system (e.g., computer system 112). In some embodiments, the exchange system may provide an interface within an existing software application system used by the employer computer system. For example, the exchange interface may include a user interface in an application tracking system used by the employer computer system via which the employer can submit the contingent job. The exchange system may, for example, generate the user interface and cause it to be displayed. The employer may, for example, access the exchange interface through a browser application on the employer's computer system.

FIG. 9 illustrates an example user interface 900 that the exchange may provide to an employer computer system to create a job listing. In some embodiments, the exchange may generate the user interface and present it in a display of the employer computer system. In some embodiments, the exchange may transmit code (e.g., HTML, Javascript, CSS) to the employer computer system that, when executed, causes the user interface to be displayed in a display of the employer computer system. In some embodiments, the employer may enter information such as a requisition type (e.g., contingent, permanent, contract), a job title, a job location, a bill rate range, a pay rate range, a target start date, a target end date, a duration of employment, a number of positions that are to be filled, an exemption status, and/or identification (e.g., a name) of a hiring manager. In some embodiments, the exchange may further provide the employer with an ability to indicate whether the exchange should allow for staffers and/or prospective workers to bid for different billing rates or ranges than specified in the requisition. The exchange interface may also allow the employer to enter other information such as an urgency for the job, minimum education requirements, expected number of hours per week, who the position reports to, required skills for the job, and/or preferred skills for the job. The exchange may generate an interface that allows an employer to enter the information via selections (e.g., drop down selection(s), check box, radio buttons), by entering text, or by any other suitable way of receiving information via the interface.

Although examples of information are described herein, embodiments are not limited to any particular type or format of information that can be entered into the exchange interface. The exchange interface may be adapted to remove and/or add different information, fields, options, and other elements for receiving job requisition information from an employer computer system.

Next, process 200 proceeds to block 202, where the exchange analyzes the requisition for a contingent job that may be created within the system. According to some embodiments, the exchange may receive the information entered by the employer in the exchange interface, and generate a storage record in a database of the exchange. In some embodiments, the exchange may create a storage unit for the job requisition. In one example, the exchange may create an entry in the database for the job requisition. In another example, the exchange may create one or more documents in a non-relational database of the exchange system. The exchange may store details about the job in the job requisition record. The record may, for example, include one or more fields that the exchange may populate using the requisition submitted by the employer computer system. In some embodiments, the exchange may map fields of the exchange interface to fields in a requisition record stored in a database, and store information in a mapped field.

In some embodiments, the exchange may further analyze the job requisition for validity. For example, the exchange may determine whether information entered into fields of the exchange interface is valid (e.g., valid characters). In another example, the exchange may determine whether dates entered for the job requisition are valid (e.g., not in the past). In some embodiments, the exchange may further assign the job requisition a unique identifier. The exchange may store the unique identifier as part of the job requisition record.

Next, process 200 proceeds to block 203, where the exchange system submits the defined requisition to one or more staffing agencies. This may be performed, for example, through a programmatic connection between the exchange and the staffing agency computer system platforms. In some embodiments, the exchange system may include an API via which the exchange system can interact with a staffing platform (e.g., a staffing computer system and/or software). According to some embodiments, the exchange system transmits a job requisition record to the staffing platform via the API. For example, the exchange system may transmit data related to details of the job requisition. In some embodiments, the exchange system may retrieve records of the job requisition from a stored record of the job requisition. In some embodiments, the exchange system may additionally or alternatively retrieve information about the job requisition inputted by an employer via an exchange interface (e.g., a user interface). The exchange system may execute software code that may allow the exchange system to transmit the job requisition data. In one example, the exchange system may execute a software code to access information about a job requisition. The code, when executed, may access information stored about the job requisition (e.g., in a job requisition record) and transmit the information to a storage (e.g., a database) of the staffing platform.

In some embodiments, the exchange system may allow a staffing entity (e.g., a staffing firm, recruiter) to submit candidates for the job requisition. For example, the staffing agencies may submit one or more candidates for a temporary job requisition. In one embodiment, the exchange system provides an interface(s) through which a user(s) may review requisitions and submit candidates. According to some embodiments, the exchange system may allow a staffing platform to access job requisitions stored in a database of the exchange system. The exchange system may, for example, generate a user interface in which a recruiter can browse through job requisitions stored in the exchange system. The recruiter may select a particular job requisition and, in response, the exchange system may generate a user interface displaying more details about the selected job requisition. The exchange system may, for example, access data from the job requisition record and present it in the user interface.

FIG. 10 illustrates an example user interface screen 1000 via which a staffing entity (e.g., a recruiter) may submit a candidate for a particular job requisition. The exchange system may, for example, generate and present the user interface on a display of a computer system of the recruiter (e.g., a recruiter accessing the exchange system via a staffing platform). To submit a candidate, the recruiter may enter information into various fields of the user interface, attach documents, make selections, or input information about the candidate in any other suitable way. The exchange system may receive the information (e.g., in response to a user submitting the candidate). The exchange system may then store a record for the candidate in a database. In some embodiments, the exchange system may further map the submitted candidate to a stored record of the job requisition in a database of the exchange system. In one example, the exchange system may store identification(s) of candidates submitted for a job requisition in the job requisition record. For example, the exchange system may store a mapping of a unique identifier of each candidate for the job requisition in a database of the exchange system. In another example, the exchange system may store an identification of jobs that a candidate has been submitted to in a candidate record stored in the exchange system database.

According to one embodiment, each staffing agency is permitted to define and save one or more candidates within the exchange system. Such candidates may be predefined within another system, such as an applicant tracking system or ATS. For example, a staffing platform may use a specific ATS software system (e.g., Brassring) which users may use to create and define a candidate. The ATS may store information about a candidate such as identifying information (e.g., name, age), contact information (e.g., email, phone), a resume(s), cover letter(s), and other information about the candidate. In some embodiments, the exchange system may retrieve candidates from an ATS used by a staffing platform. As described above with respect to FIG. 1, the exchange system may include an API via which it may access information from a particular ATS. The exchange system may, for example, retrieve data about specific candidates. In another example, a staffing agency may submit candidates from an ATS used by the staffing agency to the exchange system (e.g., via the API). The staffing agency may transmit data about the candidate via the API. The exchange system may receive the data and create a candidate record for the candidate in a database of the exchange system.

In some embodiments, the exchange system may match a worker stored in a worker pool (e.g., worker pool 102) in a database (e.g. worker database 104) with a job requisition. The exchange system may, for example, match a worker record stored in the database with the job requisition. In some embodiments, the exchange system may match the worker to the job requisition in response to a submission of the worker as a candidate to the job requisition. In another embodiment, the exchange system may automatically match a stored worker record to the job requisition. The exchange system may match the stored worker record based on a past history of the worker working for a respective employer, skills of the worker relative to the job requisition, and/or other factors. The exchange system may maintain a worker record such that staffing firm users may access the worker record and submit the worker to a job requisition. According to some embodiments, the exchange system's worker database may eliminate a need for individual staffing computer systems to store worker records.

Next, process 200 proceeds to 204, where the exchange system allows a user to preview and process a particular candidate. The user may, for example, be a hiring manager or human resources employee of an employer who submitted a job requisition that the candidate has been submitted for. The exchange system may provide a user interface via which the user may access information about the candidate. In some embodiments, the user may access the exchange interface on a computer system used by the user. The user may, for example, access the exchange interface through a website using a browser application. In another embodiment, the user may access the candidate information from the exchange system using an ATS software application used by the employer computer system. The exchange system may, for example, transmit information to the ATS about the submitted candidate (e.g., via an API). In another example, the exchange system may allow the ATS to retrieve information from a database of the exchange system (e.g., via an API).

Figure 11A:
FIGS. 11A-C show example user interface screens for reviewing candidate submissions for a job according to various embodiments of the present invention.
Figure 11B:
Figure 11C:

FIGS. 11A-C illustrate example user interface screens that allow an employer to review candidates submitted for one or more job requisitions. For example, FIG. 11A illustrates a user interface screen 1100 that displays a list of job requisitions posted by the employer that the employer can browse. The list may, for example, display information about each of the job requisitions such as pending and/or expiring candidates, location of the job, title of the job, expiration time and other information. Embodiments are not limited to any specific type of information that may be displayed. The exchange system may populate information on the user interface from a job requisition record stored in the database of the exchange system. A user may select a specific job requisition to view candidates submitted for the selected job requisition. FIG. 11B illustrates an example user interface screen 1110 showing candidates that have been submitted for a given job requisition. The exchange system may access submission records from a database of the exchange system to populate information in the user interface screen about candidates submitted for the job requisition.

FIG. 11C illustrates an example user interface screen 1120 that a user may use to accept a candidate (e.g., for hiring). The user may, for example, access the screen by selecting a specific candidate from the user interface screen shown in FIG. 11B. The employer may review additional information about the submitted candidate. The exchange system may provide options for the submitted candidate. For example, the exchange system may provide an option for a user to indicate that the employer is not interested. The exchange system may additionally or alternatively provide an option for the user to indicate that the employer would like to accept the candidate. As shown in user interface screen 1120 and 1122, the employer may select to accept the candidate. The exchange system may require the employer to confirm acceptance in user interface screen 1122. The exchange system may further determine whether the candidate has already been submitted for the job (e.g., by another recruiter and accepted by the manager) as described in further detail below. In this case, the exchange system may, for example, generate a user interface screen 1124 indicating to the employer that the candidate already exists in the system. The employer may be allowed to still accept the candidate or to cancel as shown in interface screen 1124.

In some embodiments, when a user indicates acceptance of a candidate for a job requisition, the exchange system may export the candidate to a computer system (e.g., an employer computer system). In one example, the employer computer system may use an ATS (e.g., Brassring). In response to a user accepting a candidate, the exchange system may transmit a record of the candidate to the ATS used by the employer computer system. The exchange system may, for example, transmit the candidate via an API that provides an interface to the employer ATS. In some embodiments, the candidate may then be stored in the employer computer system as a candidate for the job requisition.

In some embodiments, the exchange system may determine whether a submitted candidate already exists in a computer system (e.g., an employer computer system). The exchange system may access data records of the candidate to determine whether the candidate has already been submitted to the respective computer system. For example, the exchange system may identify a stored record of the candidate being accepted for the job requisition in a job requisition and/or candidate record. In some embodiments, the exchange system may identify each candidate with a unique identification (e.g., a unique alphanumeric identifier). The exchange system may determine, for example, if the candidate has been submitted by determining if a candidate with the identifier is stored in the employer computer system (e.g., in the ATS) and/or is associated with the job requisition. In another example, the exchange system may determine whether the identifier has been accepted for the job requisition in a record stored in the exchange system database.

According to some embodiments, when the exchange system identifies that the candidate does exist in the computer system, the exchange system may generate an alert indicating to the user that the candidate is already stored in the computer system. For example, as shown in FIG. 11C, the system may generate an alert message indicating to a user that the candidate already exists in an ATS of the employer computer system. In some embodiments, the exchange system may provide the user with an option to continue accepting the candidate and creating a new application. The exchange system may further provide an option to cancel the acceptance. In another embodiment, the exchange system may allow the user to associate an existing record of the candidate with the job requisition.

After a candidate is submitted to a job, process 200 proceeds to block 205, where the system permits one or more users to track the candidate through the hiring process until that candidate is placed. The exchange system may update a record associated with the candidate and/or the job requisition record based on updates received from an employer computer system and/or a staffing platform. For example, a hiring manager or a human resources representative may update a status of the candidate in various stages of a hiring process (e.g., phone interview, first in person interview, second in person interview, offer, hired). The exchange system may automatically update a record of the candidate in a database of the exchange system. According to some embodiments, the exchange system may further update a status of the candidate in other computer systems. For example, in response to an update in an employer computer system (e.g., an ATS used by the employer), the exchange system may automatically update the candidate status in a staffing platform (e.g., an ATS used by a staffing computer system). In this manner, the exchange system may synchronize candidate status records across all entities concerned with placement of a candidate.

After placement of a candidate to a job requisition, process 200 proceeds to block 206 where the system continues tracking the candidate after the placement. The system permits, according to various embodiments, post hiring tracking at block 206. The inventors have appreciated that in conventional systems, there generally is no visibility of an applicant past the placement of that candidate. For example, after placement of a candidate is complete, any functions associated with post placement activities (e.g., invoicing, distribution of payments) cannot be performed by conventional systems.

In some embodiments, after placement of a candidate, the exchange system may track a status of the placed candidate, who may now be referred to as a worker. In some embodiments, the worker may be a temporary worker hired for a time limited job (e.g., a contract). The exchange system may, for example, track whether the worker has started working, and/or an onboarding status of the worker. In some embodiments, the exchange system may perform a handshake process between a staffing platform and the employer computer system to complete placement of a candidate. Example processes that the exchange system may perform to complete such a handshake are described below with reference to FIGS. 6A-B.

According to various embodiments, the exchange system may provide timesheet management functionality after placement of the candidate in block 206. In such embodiments, after placement of a candidate, process 200 proceeds to block 207, where the exchange system provides various timesheet functionalities such as those by an employer, staffing agencies, the employee, and the exchange system (e.g., scout). In some embodiments, the exchange system may interact with multiple entities in order to track timesheet data. The exchange system may interact with an employer computer system, a staffing platform, and a computer system used by a worker (e.g., an employee). In one example, the exchange system may receive time sheets submitted by a worker via a client computer system. The exchange system may store the timesheet and/or transmit it to an employer computer system where a user (e.g., a manager) may approve the timesheet. The exchange system may further store an approval of the timesheet. In some embodiments, the exchange system may transmit a timesheet back to the worker computer system or request the worker to modify the timesheet if it is rejected by the manager.

According to some embodiments, the exchange system may further generate an invoice using stored timesheet data. The inventors have appreciated that conventional systems are unable to automatically generate invoices for candidate placement as they lack an ability to access data (e.g., timesheet data) which is required to generate an invoice for paying parties involved in a candidate placement. The exchange system, which includes interfaces with multiple computer systems of entities involved in a candidate placement process, may interact with the different systems to provide this functionality.

Next, process 200 proceeds to block 208, where, according to some embodiments, the exchange system may perform additional functions, such as supplier onboarding and the creation and management of invoices, and coordination between systems, improving the efficiencies between all of these entities. According to some embodiments, the exchange system may generate an invoice using by interacting with multiple computer systems, accessing data from multiple systems, and/or accessing data stored in a database of the exchange system. An example process that the exchange system may perform to interact with multiple systems to generate an invoice is described below in reference to FIGS. 3A-B.

Next, process 200 proceeds to act 209, where the exchange system may perform other functions. In some embodiments, the exchange system reporting and analytics functions. In some embodiments, the exchange system may access information (e.g., data) from computer systems of entities involved in a candidate placement to generate reporting and analytics regarding the placement process. In one example, the exchange system may calculate and display statistics about a hiring process such as statistics regarding qualifications of the candidates and/or hired workers. The exchange system may further generate a report about the placement process. The report may, for example, capture identities of people involved in a placement (e.g., a recruiter, hiring manager, employer, staffing agency). The exchange system may generate the reports and present them to a user(s) in a user interface.

Figure 3A:
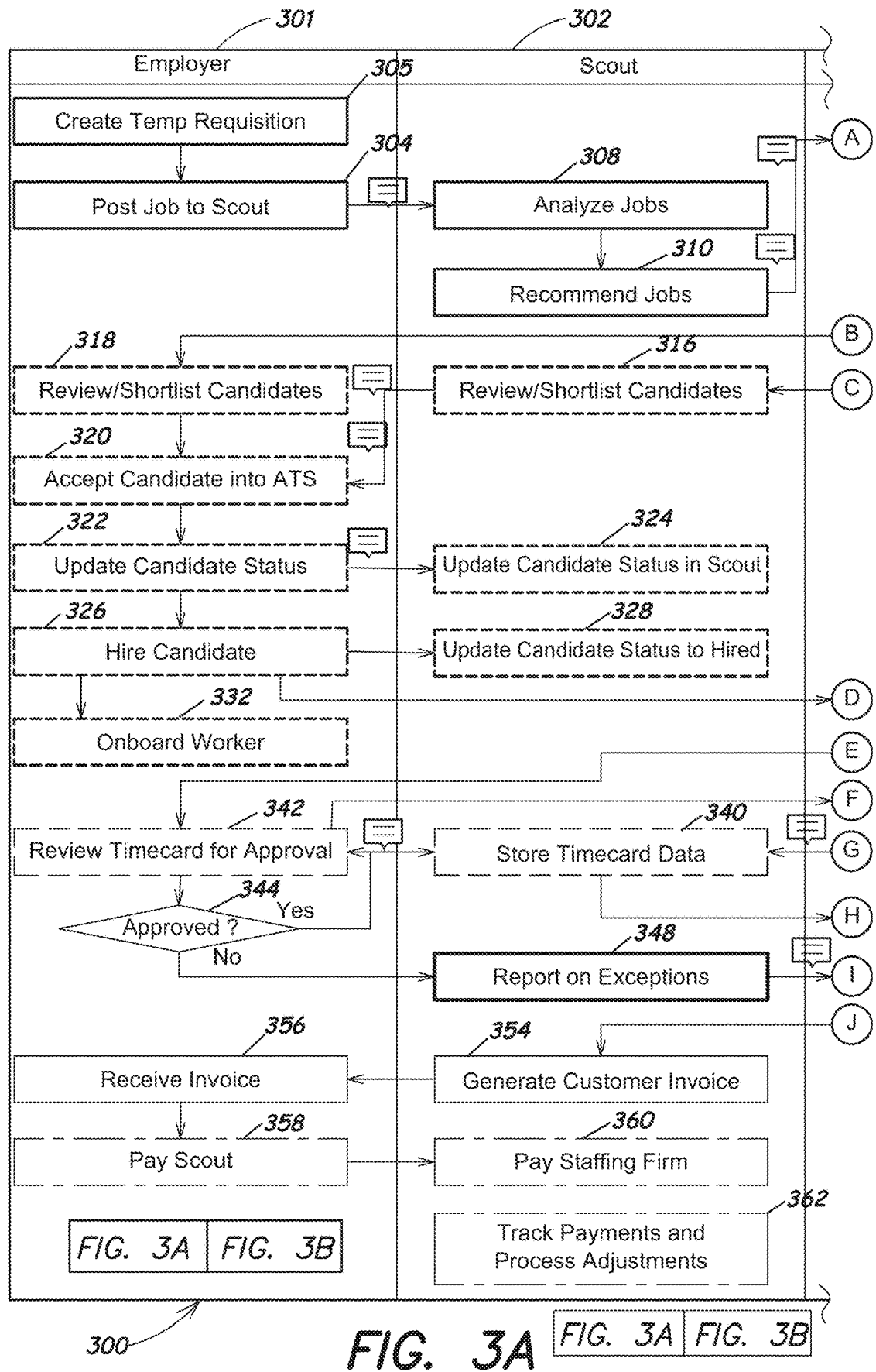
FIGS. 3A-B show a more detailed set of processes for managing temporary workers according to one embodiment of the present invention.
Figure 3B:
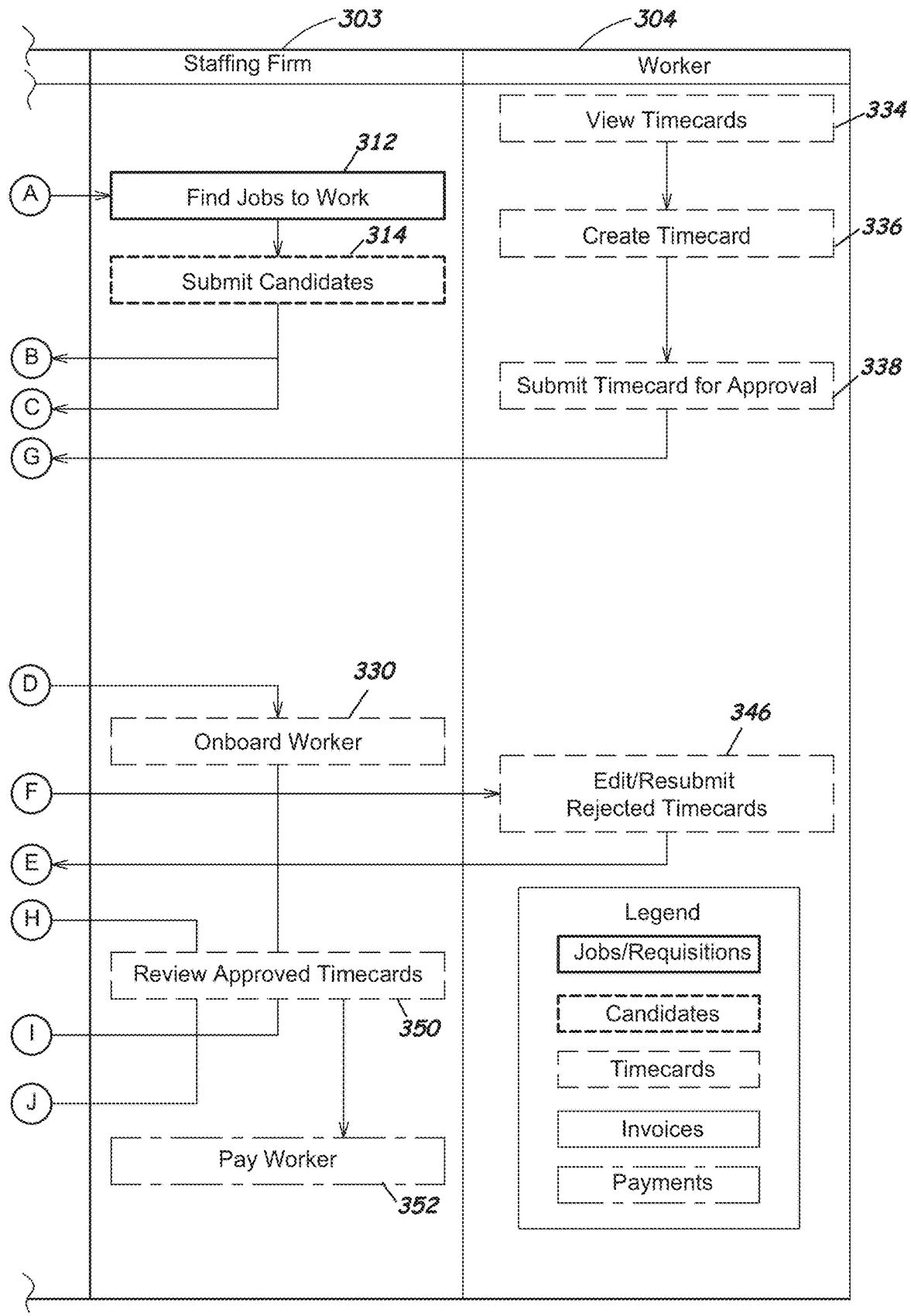

FIGS. 3A-B is a flow diagram illustrating an interaction 300 of an exchange system 302 (e.g., scout) with (1) an employer computer system 301, (2) a staffing computer system 303, and (3) a worker computer system 304. In one example, the exchange system may perform interactions shown in FIGS. 3A-B for managing temporary workers according to one embodiment of the present invention.

Although example embodiments are discussed herein with reference to temporary workers, embodiments are not limited to managing any particular type of worker. The processes described herein may be performed and/or adapted for other types of worker (e.g., part time, permanent, full-time) as embodiments are not limited in this respect. Further, the exchange system may be configured to perform other functions and interactions not shown or described herein. The exchange system may also interact with other systems not shown or described herein.

The candidates may be received and stored by the exchange system, and exchange system may automatically provide an employer computer system a short list of the candidates that were received. Such information may be received into an applicant tracking system, and that candidate may be hired for the job posting created by a particular employer. Responsive to the hiring, the candidate status may be updated within the exchange system and a record may be associated with that hired candidate that links the hired candidate with the particular staffing firm. Thereafter, operations associated with the candidate that is placed may be linked to that particular staffing firm. In one example, the staffing firm may be paid based on work performed by that particular candidate, and therefore it may be useful to track information associated with the candidate after he/she has been placed.

According to one embodiment, as shown at block 305, an employer may create a temporary job requisition and a corresponding job entry may be posted to the exchange system. In some embodiments, the employer may create a job requisition in the employer computer system 301. Next, at block 306, the employer computer system 301 may transmit the job requisition to the exchange system 302. The employer computer system 301 may, for example, transmit the job requisition to the exchange system as described above with reference to FIG. 1 and FIG. 2 (e.g., via an API of the exchange system 302). Responsive to the posting, at block 308, the exchange system 302 may analyze the job. The exchange system 302 may, for example, analyze the job as described above with reference to FIG. 2. For example, the exchange system 302 may identify one or more attributes of the job (e.g., a title, start date, end date, salary, billing rate, required skills) and further store a record for the job in a database of the exchange system 302. The exchange system 302 may further analyze the job for validity (e.g., to validate dates). In some embodiments, as shown at block 310, the exchange system 302 may recommend jobs to one or more staffing firms. In some embodiments, the exchange system 302 may transmit data related to a job requisition record to a staffing firm 303. In some embodiments the exchange system 302 may transmit jobs to a staffing computer system (e.g., a staffing platform). The exchange system 302 may, for example, transmit job information as described above in reference to FIG. 2. For example, the exchange system 302 may transmit a job requisition record via an API of the exchange system 302 with the staffing computer system 303. At block 312, a user of the staffing computer system 303 (e.g., a recruiter) may access the jobs (e.g., in a user interface view). In some embodiments, the exchange system 302 may regularly submit jobs to the staffing computer system. A staffing firm employee may, through a computer interface, search for jobs to place candidates (or receive an indication of new jobs associated with that particular staffing agency). At block 314, a recruiter may submit one or more candidates programmatically through a staffing computer system. In some embodiments, the staffing computer system may use an application tracking system (ATS) for maintaining a record of prospective workers. A recruiter may submit a candidate to a job through the ATS. The exchange system 302 may, for example, include an API to an ATS used by the staffing computer system 303 via which the exchange system 302 can receive and/or access candidates from a staffing computer system.

In some embodiments, a recruiter may submit candidates for a job requisition to the exchange system 302. The exchange system 302 may, as shown in block 316, review and shortlist the candidates. In some embodiments, the exchange system 302 may filter candidates. The exchange system 302 may filter candidates by data related to qualities and/or an identity of a candidate and determine whether the candidate is appropriate for a given job record. In one example, the exchange system 302 may determine whether the candidate has been previously submitted for the job (e.g., by another recruiter or by the same recruiter in the past). The exchange system 302 may, for example, determine whether a unique identifier associated with the candidate is associated with a job requisition in a database of the exchange system 302. In some embodiments, the exchange system 302 may determine if other attributes match up with job requirements (e.g., pay rate, time of employment). In some embodiments, the exchange system 302 may further allow a user (e.g., an exchange agent) to review candidates and/or filter candidates.

In some embodiments, the staffing computer system 303 may transmit candidates to the employer 301. The staffing computer system 303 may transmit candidates via the exchange system 302 to an employer computer system 301. A user may submit a candidate to the exchange system 302 which may, in turn, transmit submitted candidates to an employer computer system 301. For example, the exchange system 302 may receive candidates from a staffing system 303 (e.g., a staffing ATS) via a staffing API and transmit candidates to an employer computer system 301 (e.g., an employer ATS) via an employer API.

At block 318, the employer 301 may review candidates for the job. At block 320, the employer may accept a candidate. In some embodiments, the employer may accept a candidate into an ATS used by the employer computer system 301. For example, the candidate may be stored as a candidate for the job within the ATS used by the employer computer system 301. In some embodiments, as shown at block 322, the employer may update a candidate status. The employer may transmit an indication of a candidate status update to the exchange system 302. At block 324, the exchange system 302 may update the status of the candidate (e.g., within a database of the exchange system 302). In some embodiments, the exchange system 302 may update a candidate status responsive to receiving an indication from the employer computer system 301. The indication may, for example, comprise a message including data related to updated information regarding a candidate's status in a hiring process. The exchange system 302 may update a candidate record based on the information in the message in a database of the exchange system 302.

According to some embodiments, at block 326, the employer may update a candidate status to hired. This may indicate that the candidate has been hired by the employer. In some embodiments, the employer computer system 301 may transmit an indication of the candidate status update to hired to the exchange system 302. The exchange system 302 may update the candidate status as well (e.g., in a database of the exchange system 302). In some embodiments, the exchange system 302 may update the candidate to a hired status responsive to receiving an indication from the employer computer system 301. Upon updating a candidate status to hired, the employer may further perform other processes to onboard the hired candidate as a worker 326.

The inventors have recognized and appreciated that the exchange system 302, by interacting with different entities may maintain an updated record of a plurality of candidates in a manner that is not possible in conventional system. As conventional staffing and employer systems are disparate, and disconnected, there is not a central storage record of candidate information. As a result, databased of disparate systems are often unsynchronized and unreliable with respect to storing candidate records. The exchange system 302 allows for accurate, efficient, and up to date tracking of a candidate placement.

After hiring, an employee may be on-boarded, and to this end, the employer system and exchange may perform a programmatic onboarding process. The exchange system may interact with one or more computer systems in a number of different workflows, such as generating customer invoices, paying staffing firms, tracking payments and process adjustments, among other workflows. The distributed system may also include a number of other components that interface and/or reside on other systems such as staffing firm software platforms, or other systems. A worker may be provided a number of different interfaces and/or functionality that is included in one or more workflows. For example, the worker may be permitted to create and view timesheets, submit timesheets for approval, edit and resubmit rejected timesheets among other functions.

As described above in reference to FIG. 2, the exchange system 302 may further enable functionality associated with management of timesheets. A worker may access time cards via a worker computer system 304. At blocks 334 and 336, the worker may access, view, create, and/or edit a time card. A timesheet may comprise a record of work performed by the worker. The timesheet may, for example, include information about time spent on one or more tasks, dates of time worked, vacation time taken, paid time off, and/or other information. At block 338, the worker may submit the timesheet.

In some embodiments, the worker may submit the time card to the exchange system 302. For example, responsive to a timesheet submission, the worker computer system 304 may transmit the timesheet to the exchange system 302. In some embodiments, as shown in block 340, the exchange system 302 may store the timesheet record in a database of the exchange system 302. In some embodiments the exchange system 302 may extract and store data from a submitted timesheet. For example, the exchange system 302 may receive a timesheet from the employer computer system 304 via an API. The exchange system 302 may, in response, extract data from the timesheet. The exchange system 302 may store a record of work, and time spent on work, in a database of the exchange system 302.

In some embodiments, the worker may further submit the timesheet to the employer (e.g., to the employer computer system 301). The worker may submit the timesheet to the employer via the exchange system 302. For example, the worker computer system 304 may transmit the timesheet to the exchange system 302. The exchange system may then store the timesheet and transmit the timesheet to the employer computer system 301.

At block 342, the employer may review a submitted timesheet for approval. The employer computer system 301 may perform automatic validation. Additionally or alternatively, the employer computer system 301 may allow a user (e.g., a manager) to review a submitted timesheet. At block 344, the employer may either approve or reject a submitted timesheet. If the employer approves the timesheet at block 344, the employer computer system 301 may transmit an indication of the approval to the exchange system 302. The exchange system 302 may update a record of the timesheet data in a database of the exchange system 302 (e.g., in response to receiving the indication). The exchange system 302 may, for example, receive a message via an API from the employer computer system 301 indicating approval of a submitted timesheet.

If the employer rejects the timesheet at block 344, the employer computer system 301 may transmit an indication of the rejection to the exchange system 302. In some embodiments, the exchange system may update data in a database of the exchange system 302 about the rejection of the timesheet. The exchange system 302 may, for example, receive a message via an API from the employer computer system 301 indicating rejection of a submitted timesheet. In some embodiments, as shown at block 348, the exchange system 302 may further determine exceptions to an indication of a rejection. For example, the exchange system 302 may determine that, despite being rejected, the timesheet still includes data that is to be stored.

In some embodiments, the exchange system 302 may further transmit timesheet and/or timesheet data to the staffing computer system 303. In some embodiments, the exchange system 302 may transmit approved timesheets. In some embodiments, the exchange system 302 may transmit approved timesheets and those that are under an exception.

In some embodiments, if the timesheet is not approved, the employer may transmit the timesheet back to the worker for editing and/or resubmission. In one embodiment, the employer computer system 301 may transmit the timesheet back to the worker computer system 304 via the exchange system 302. The exchange system 302 may, for example, receive an indication of a need to edit or resubmit a timesheet. At block 346, a worker may edit and/or resubmit a rejected timesheet. In response to resubmission of the time card, the timesheet may be transmitted to the employer computer system 301 for approval as described above.

In some embodiments, at block 354, after one or more timesheets have been stored, the exchange system 302 may use the stored timesheet data to generate an invoice. The exchange system 302 may, for example, use timesheet data stored in a database of the exchange system 302 to generate an invoice. The exchange system 302 may, for example, generate an invoice to pay one or more entities involved with placement of a candidate (e.g., a staffing firm, a manager of the exchange system). The exchange system 302 may also use additional data, in addition to the timesheet data, to generate the invoice.

At block 356, the exchange system 302 transmits a generated invoice to the employer. In some embodiments, the exchange system 302 may transmit the invoice to the employer computer system 301. Upon receipt of an invoice from the exchange system 302, at block 358, the employer may transmit funds to the exchange system 302 (e.g., Scout). In some embodiments, the employer computer system 302 may transmit an electronic payment to the exchange system 302 which may process the payment. In some embodiments, as shown at block 360, the exchange system 302 may pay a staffing firm involved with a placement of a candidate. In some embodiments, the exchange system 302 may pay the staffing firm in response to receiving a payment from the employer. The exchange system 302 may, for example, automatically dispense funds to an account of the staffing firm. In some embodiments, as shown at block 362, the exchange system may perform other functions such as tracking of payments and processing adjustments. For example, the exchange system 302 may verify that all parties have been paid correct amounts. In another example, the exchange system 302 may adjust payments (e.g., in response to new and/or corrected timesheets).

Figure 4A:
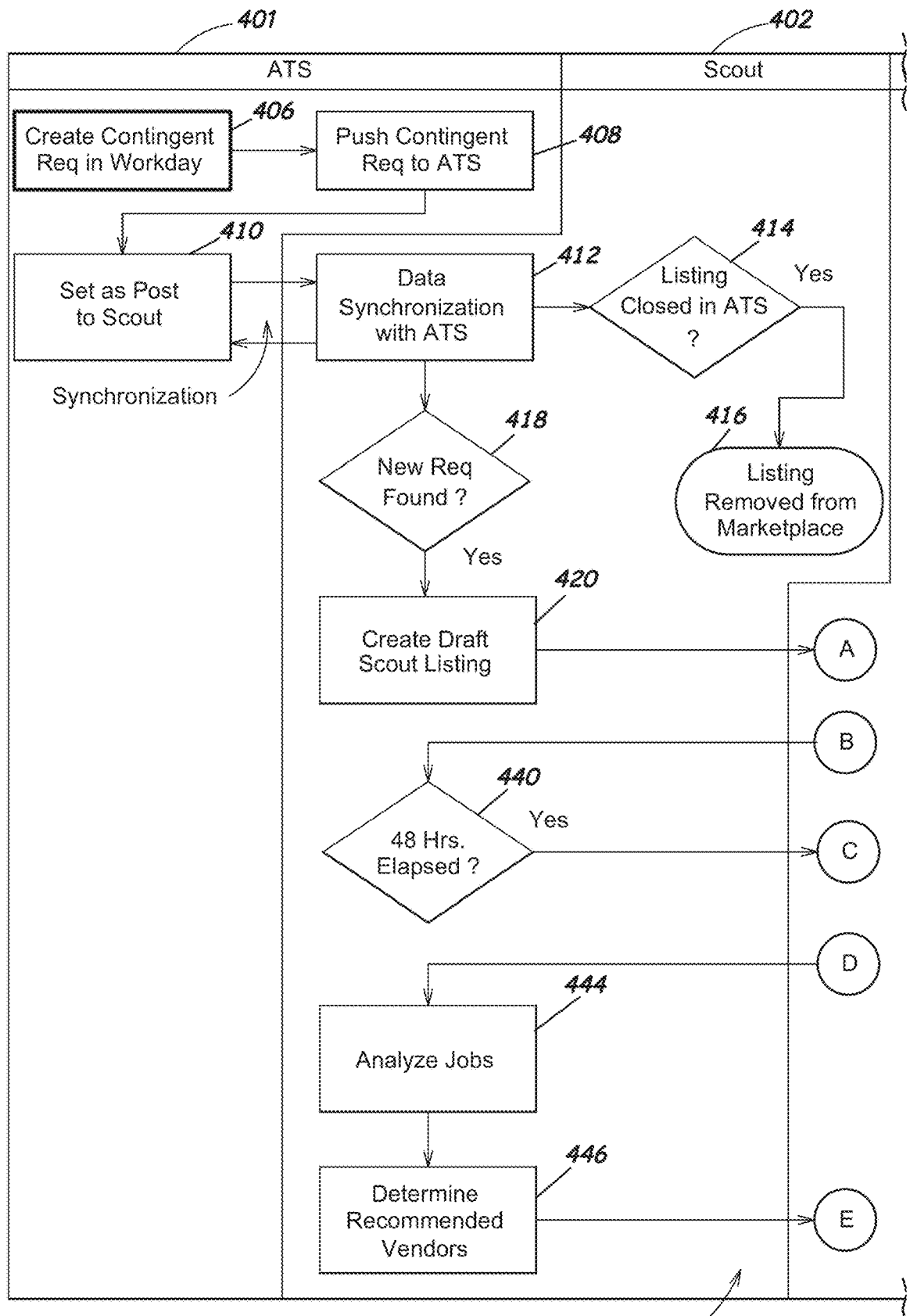
FIGS. 4A-B show an example process for creating a temporary job in a distributed computer system according to various embodiments of the present invention.
Figure 4B:
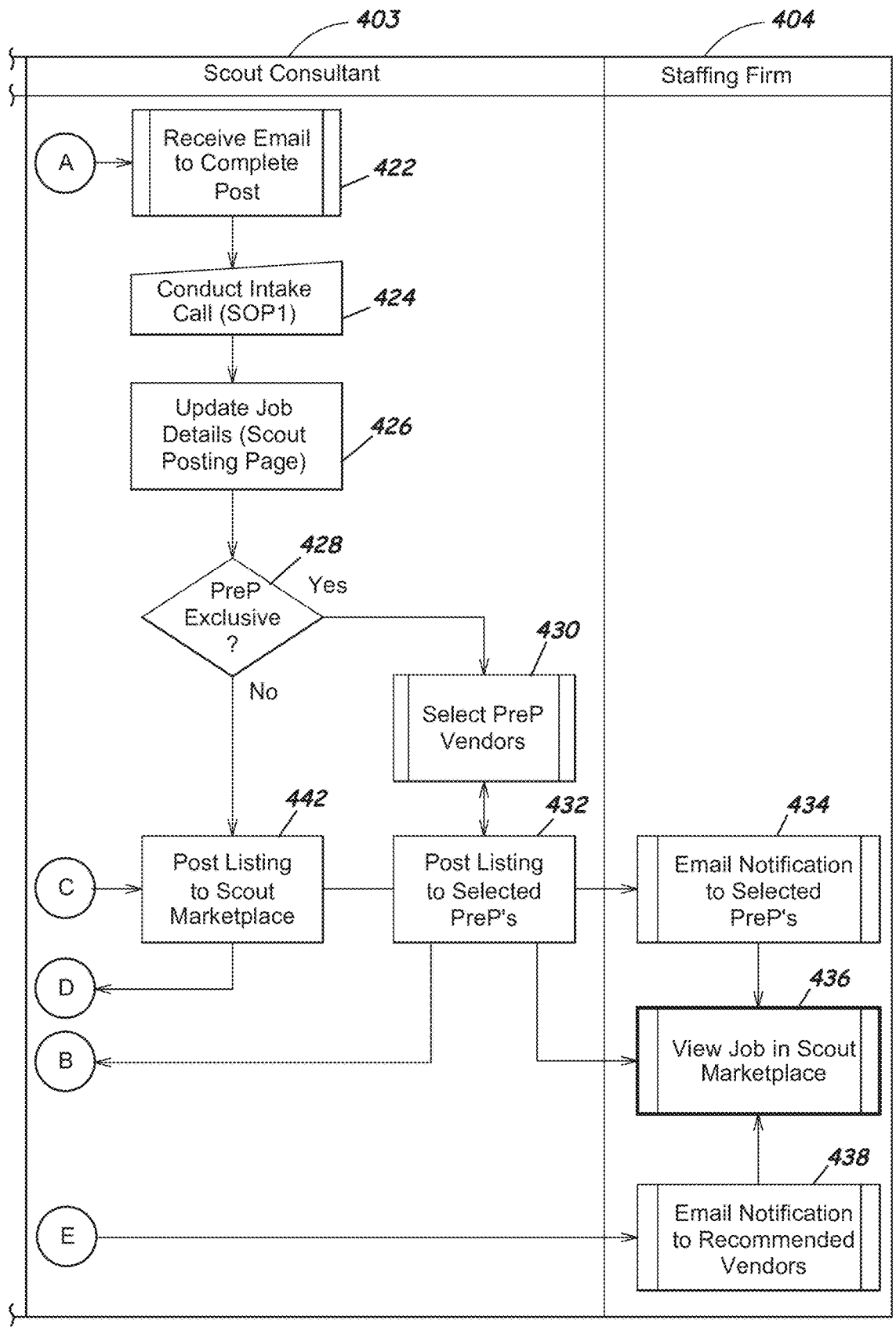

FIGS. 4A-B illustrate an example process 400 for creating a job (e.g., a job requisition) in a distributed computer system according to various embodiments of the present invention. For example, FIGS. 4A-4B show processes involving interaction between an applicant tracking system (ATS) 401, an exchange system 402 (e.g., scout), a scout consultant system 403, and a staffing firm system 404. Such processes may relate to the creation and posting of jobs within multiple staffing firms.

At block 406, at the ATS, a user may create a job requisition (e.g., a contingent requisition) within an interface. The interface may, for example, be provided by the exchange system 402 as described above with reference to FIG. 2 and FIG. 9 above. The job requisition may comprise details of a job to be filled by an employer using the ATS 401. After creating the job requisition, at block 408 the job requisition may be pushed to the ATS 401 (e.g., a storage of the ATS 401). Next, at block 410, the job requisition is posted. In some embodiments, the ATS may post new job requisitions to the exchange system 402. Once posted, the ATS may send the requisition record to the exchange system 402 using a data synchronization process. The exchange system may periodically look for new requisitions and send information to an exchange consultant system.

In some embodiments, as shown at block 412, the exchange system 402 may receive a job requisition by data synchronization with the ATS 401. The exchange system 402 may, for example, perform a data synchronization process in which one or more new job requisitions generated in the ATS are synced in the exchange system 402. In some embodiments, the exchange system 402 may receive data associated with the new job requisition via an API used by the exchange system 402 to interact (e.g., communicate with) the ATS 401. In some embodiments, the exchange system 402 may perform synchronization at a regular time interval. In some embodiments, the exchange system 402 may perform the synchronization responsive to receiving an indication of a new job requisition from the ATS 401.

At block 414, the exchange system 402 may determine whether the job requisition has been closed. For example, if a candidate has been placed for the job requisition, during a data synchronization process, the exchange system 402 may receive an indication that the job requisition is closed. If the exchange system 402 determines that this is the case, the exchange system 402 may proceed to block 416 where the exchange system 402 removes the job requisition from a listing of open job requisitions. For example, the exchange system 402 may change a status of the job requisition in a database of the exchange system 402. Further, the exchange system 402 may remove access to the job requisition (e.g., by recruiters, or a staffing platform).

At block 418, the exchange system 402 determines whether a job requisition is a new requisition. For example, the exchange system 402 may check whether the job requisition exists in a database of the exchange system 402 to determine whether the job requisition is a new one. If the exchange system 402 determines that the job requisition is a new job requisition, it proceeds to block 420 where the exchange system 402 creates a listing for the job requisition in the exchange system 402. For example, the exchange system 402 may include the job requisition as one that can be viewed and accessed by a staffing platform.

In some embodiments, upon determining a listing in the exchange system 402, the exchange system 402 may further initiate additional processes associated with the job requisition. For example, the exchange system 402 may allow a user 403 (e.g., a consultant) to perform activities associated with the job requisition. In one embodiment, an exchange consultant reviews postings and determines, responsive to the exchange system 402, one or more appropriate staffing firms to send the job listing. For example, the consultant may automatically receive a message (e.g., an email) from the exchange system 402 at block 422. The consultant may then conduct an intake call at block 424, update additional details about the job at block 426.

According to one implementation, the exchange system may track one or more preferred vendors for particular jobs, and may permit the preferred vendors to have access to these placements for a predetermined amount of time (e.g., 48 hours). Thereafter, the staffing firm may be permitted to view and respond to particular listings. At block 428, the consultant 403 may determine whether the job is exclusively to be accessed by a select set of vendors (e.g., select staffing firms). If so, the consultant may select the vendors at block 430. At block 432, the exchange system 402 may post a listing for the job requisition for the selected vendors. In one example, the exchange system 402 may update permission to access a job requisition record in a database of the exchange system 402. In another example, the exchange system 402 may make the job requisition only available to the selected specific vendors (e.g., by allowing specific usernames to access the job requisition).

Figure 12A:
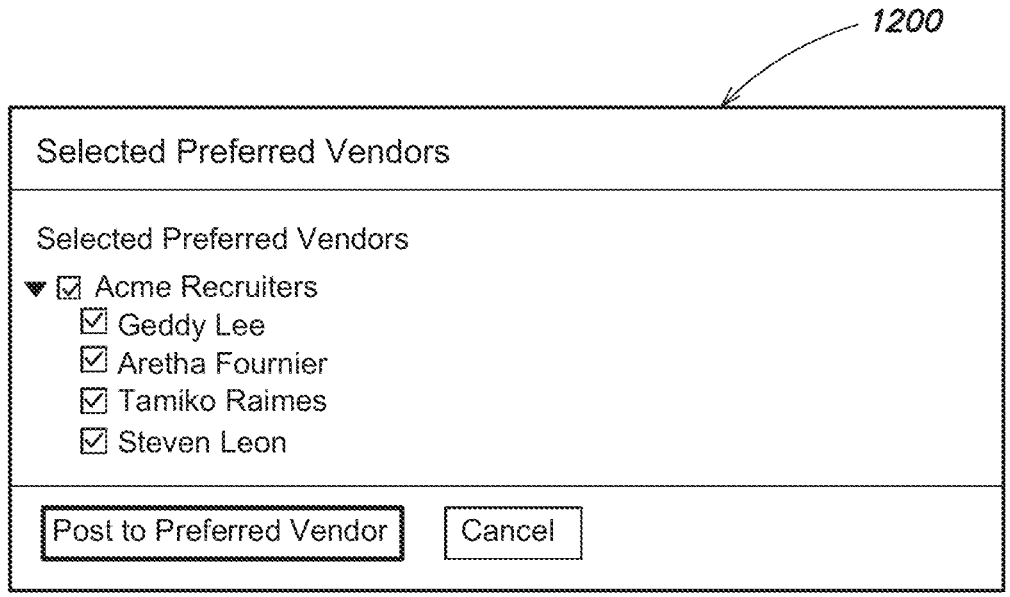
FIGS. 12A-B show example user interface screens for selecting preferred vendors according to various embodiments of the present invention.
Figure 12B:
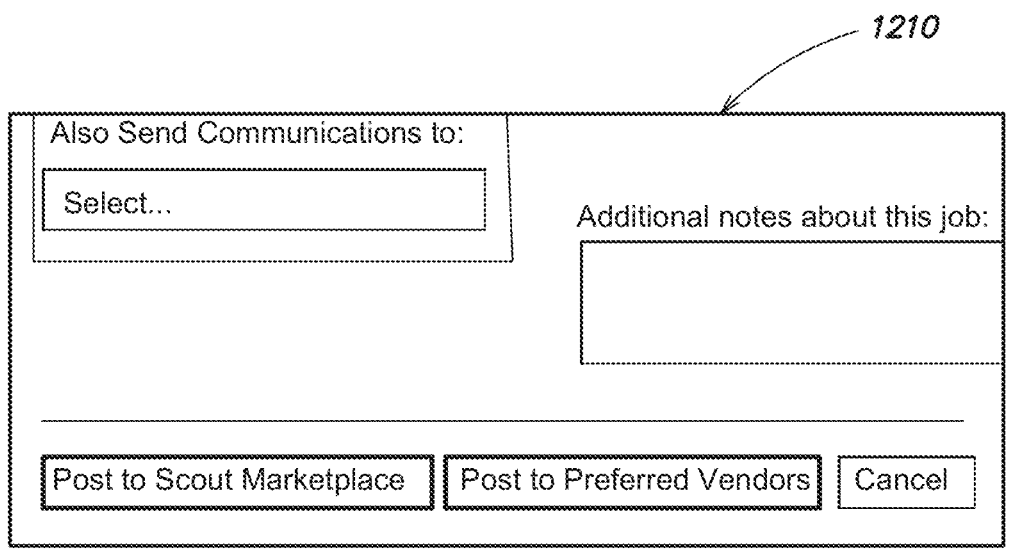

FIGS. 12A-B illustrate an example user interface screens via which the scout consultant 403 may select a preferred vendor (e.g., select specific staffing firm(s) and/or specific recruiter(s)). The scout consultant 403 may, for example, select one or more specific recruiters. The scout consultant 403 may then select an option to post the job to the selected vendors. FIG. 12A illustrates an example user interface screen 1200 via which the consultant may select preferred vendors. For example, the recruiter may be able to select a specific staffing firm and/or specific recruiters of the staffing firm. FIG. 12B illustrates an example user interface screen 1210 by which the consultant can select to post the job to the exchange or to post only to preferred vendors (e.g., those selected in screen 1200). The exchange system 402 may receive the recruiter selections and then transmit notifications, provide user access, or perform other actions based on the consultant selection(s).

At block 434, the exchange system 402 may transmit a notification to the staffing firm(s) 404 to notify the staffing firm of the posted job. In some embodiments, in response to selection of a staffing firm for the posted job, the exchange system 402 may automatically transmit a notification to one or more users associated with the staffing firm (e.g., recruiters). In one example, the exchange system 402 may transmit an email to a recruiter(s) about the job posting. In some embodiments, the exchange system 402 may additionally and/or alternatively transmit job information to a staffing platform of the staffing firm. For example, the exchange system 402 may transmit a data record storing information about the job to the staffing platform. The data record may update the staffing platform with the information in the data record.

At block 436, the exchange system 402 may allow the staffing firm 404 to view the job in an interface provided by the exchange system 402. In some embodiments, the exchange system 402 may provide an interface by which a staffing firm can view jobs. The exchange system 402 may, for example, limit jobs that can viewed by a staffing firm 404 to those jobs that the staffing firm 404 has been given access. In one embodiments, the exchange system 402 may store permissions for a job posting according to which the exchange system 402 determines which users (e.g., which staffing firms) have access to a particular job. The exchange system 402 may limit what can be viewed by a staffing firm 404 (e.g., staffing firm users) in an interface provided by the exchange system 402 based on the stored permissions.

Returning again to block 428, where consultant may determine whether the job is exclusively to be accessed by a select set of vendors (e.g., select staffing firms), if the consultant 403 determines that the job is not limited to a set of preferred vendors, then, as shown at block 442, the exchange system 402 may post the job to all vendors (e.g., staffing firms and/or recruiters). In some embodiments, the exchange system 402 may transmit a job record to a repository of job records (e.g., the Scout Marketplace). For example, the exchange system 402 may post the job record to the Scout Marketplace.

At block 444, the exchange system 402 may analyze a job posted to the Scout Market place. In some embodiments, the exchange system 402 may determine one or more details about the job based on the job record in the Scout Marketplace as described above with reference to FIG. 2. At block 446, according to some embodiments, the exchange system 402 may determine one or more recommended vendor(s) with whom the job should be shared. In some embodiments, the exchange system 402 may determine the vendor(s) based on an analysis of a job record 444. For example, the exchange system 402 my determine that the job is associated with an employer who has worked frequently with one or more vendors. The exchange system 402 may access a record of stored interactions for one or more vendors and/or employers and may determine, based on the record, that the vendor works frequently with the employer. In this case, the exchange system 402 may determine the vendor(s) as a recommended vendor. The exchange system 402 may use other methods of determining recommended vendors as embodiments are not limited to any particular way of doing so. For example, the exchange system 402 may determine preferred vendors based on pay rate of the job, location, term, experience level required, and/or any other details of the job. The exchange system 402 may access such details from a stored job record associated with the job.

At block 438, the exchange system 402 may transmit a notification to the staffing firm 404 to notify the staffing firm 404 of the posted job. In some embodiments, in response to selection of a recommended vendor (e.g., staffing firm) for the posted job, the exchange system 402 may automatically transmit a notification to one or more users associated with the staffing firm (e.g., recruiters). In one example, the exchange system 402 may transmit an email to a recruiter(s) about the job posting. In some embodiments, the exchange system 402 may additionally and/or alternatively transmit job information to a staffing platform of the staffing firm. For example, the exchange system 402 may transmit a data record storing information about the job to the staffing platform. The data record may update the staffing platform with the information in the data record. According to some embodiments, the exchange system 404 may further allow the recommended staffing firm 404 to view the job in an interface provided by the exchange system 402 at block 436 as described above.

Figure 5A:
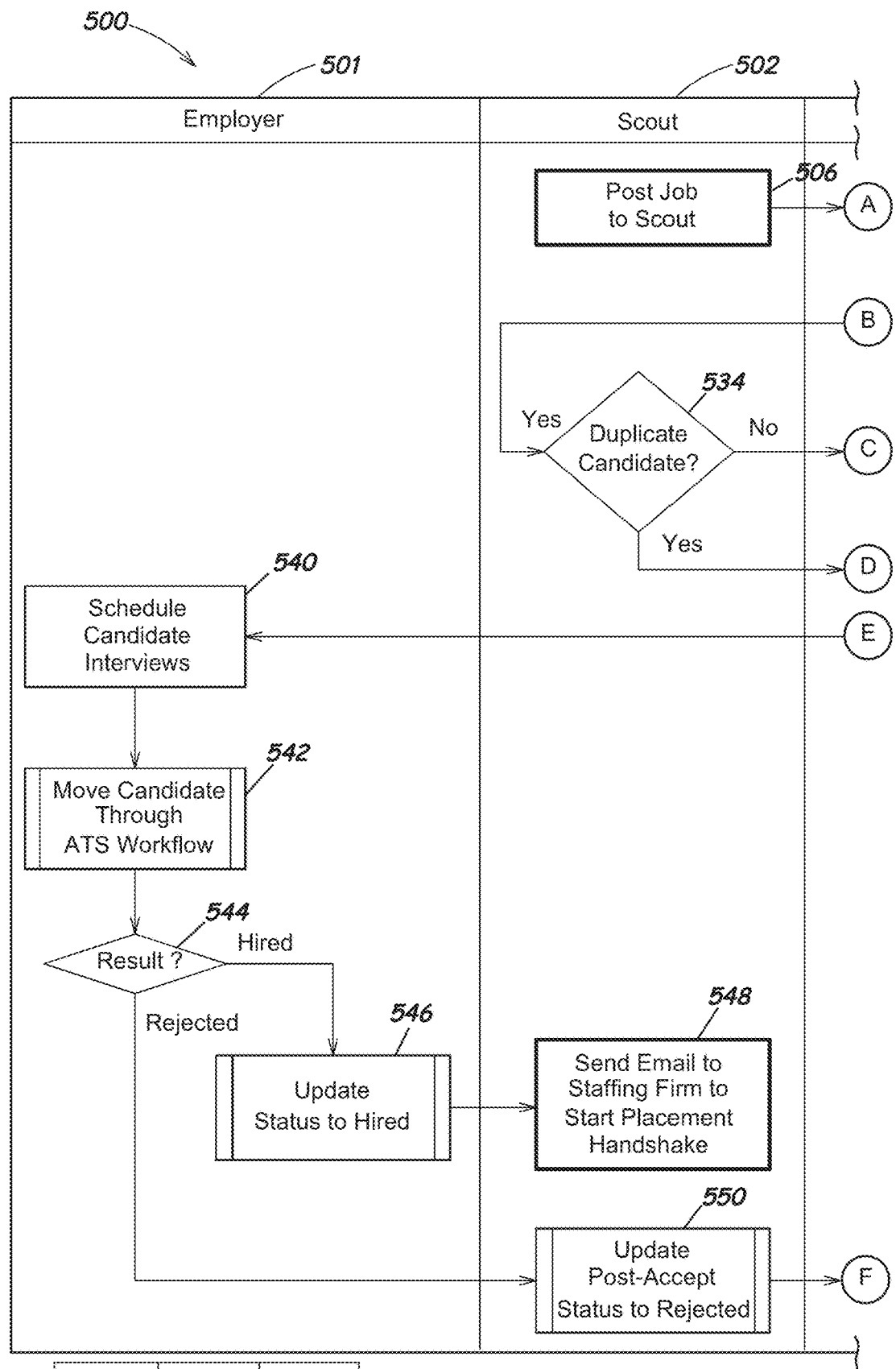
FIGS. 5A-C show an example process for placing a temporary worker in a distributed computer system according to one embodiment of the present invention.
Figure 5B:
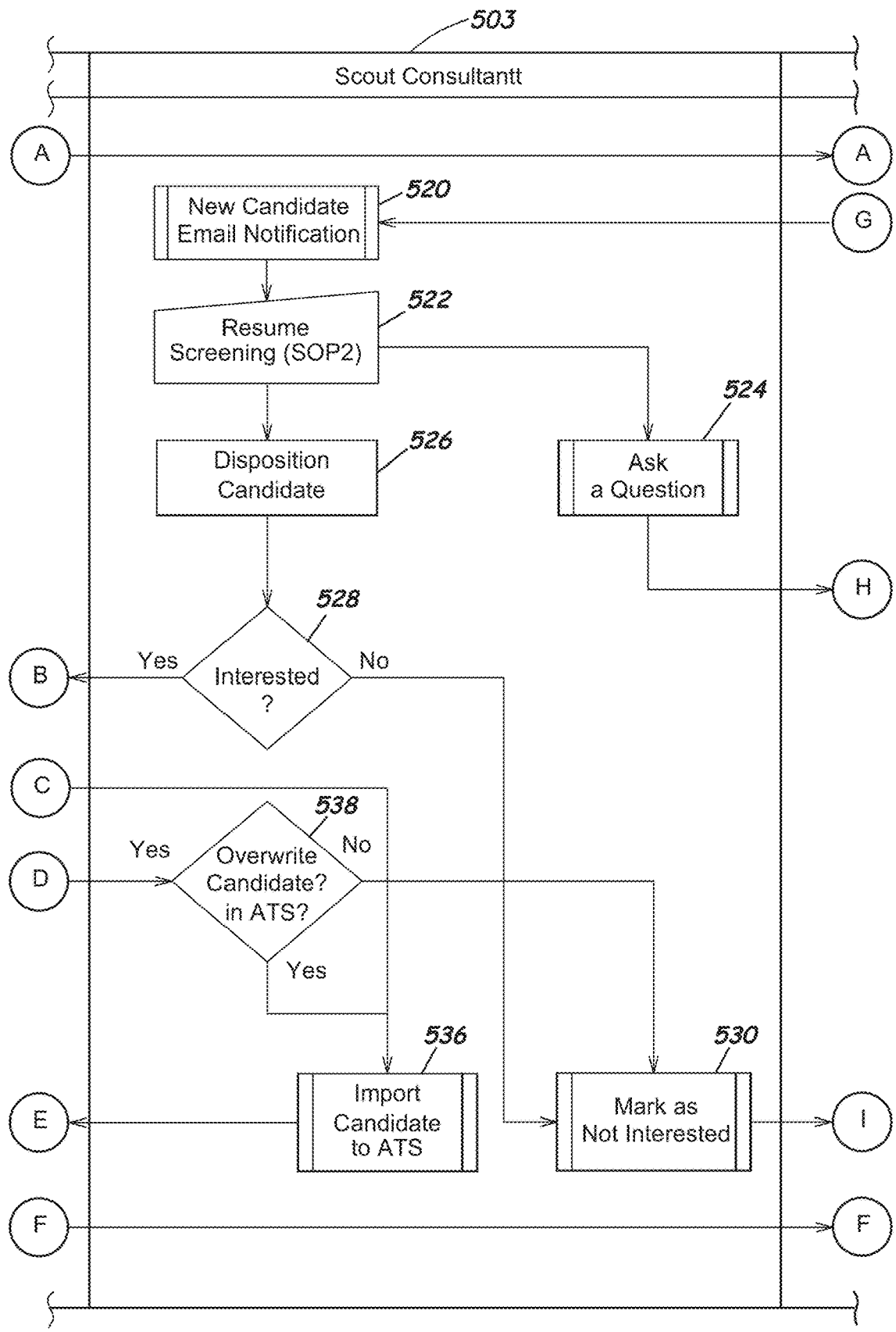
Figure 5C:
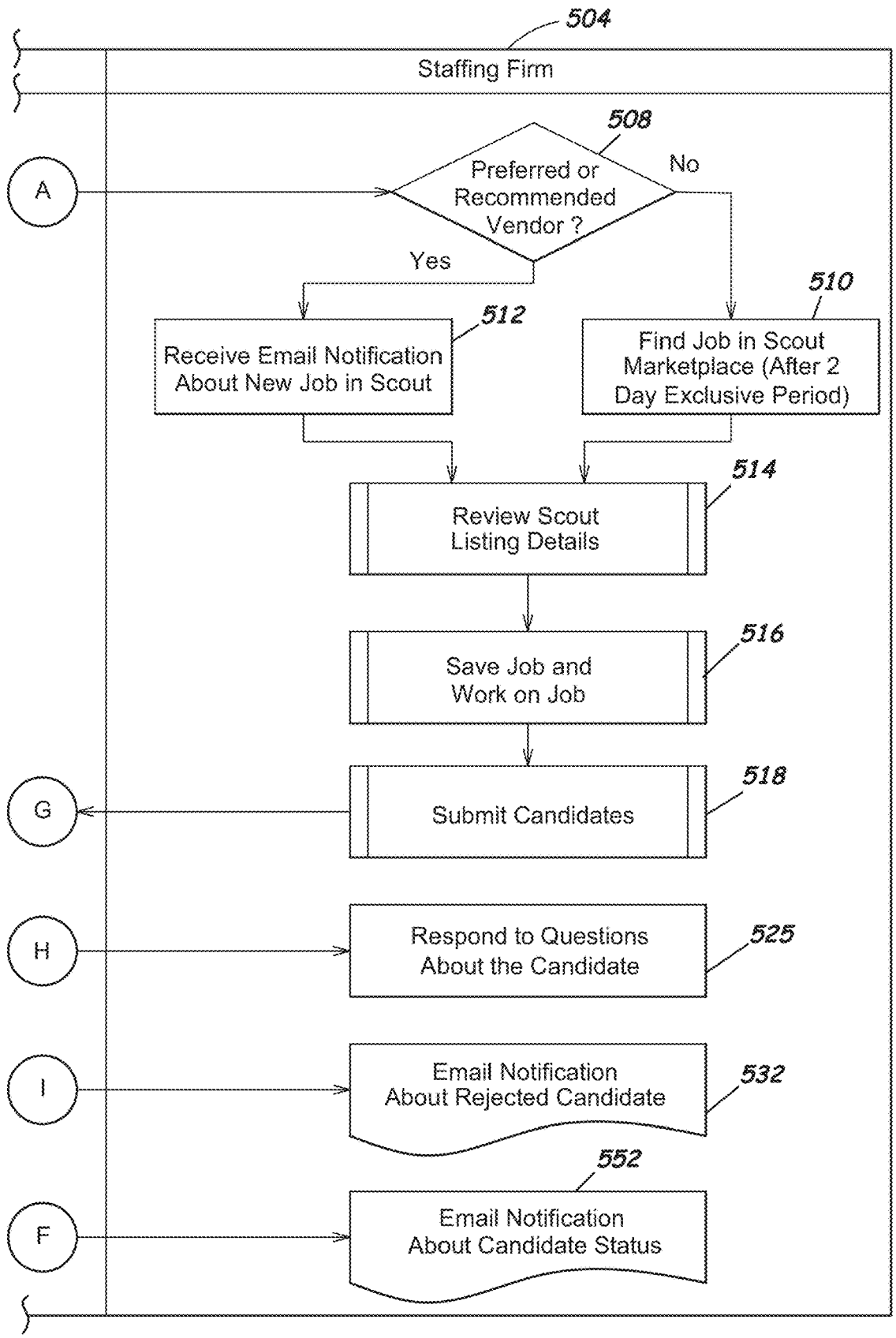

FIGS. 5A-C show an example process 500 for placing a worker (e.g., a temporary worker) to a job (e.g., a job requisition) in a distributed computer system according to one embodiment of the present invention. For instance, For example, FIGS. 5A-5C show processes involving interaction between an applicant tracking system (ATS) 501 at an employer, an exchange system 502 (e.g., exchange system 101), a scout consultant system 503, and a staffing firm system 504 (e.g., a staffing platform).

At block 506, the exchange system 502 may post the job to one or more staffing firms. As described above with reference to FIG. 2. According to some embodiments, at block 508 the exchange system may determine if a respective staffing firm (e.g., using staffing firm system 504) is a preferred or recommended vendor (e.g., a staffing firm or recruiter(s)). If, according to one embodiment, at block 512 the staffing firm is a preferred vendor, the staffing firm may be sent a notification regarding a new job in the exchange system 102 as described above with reference to FIG. 4. For example, a user of the staffing system 504 (e.g., a recruiter) may receive an email about a new job in the exchange system 502. If, according to one embodiment, the vendor is not a preferred or recommended vendor, the vendor may find the job in the exchange system 502. For example, the exchange system may provide a non-preferred or recommended vendor access to the job after a period of time designated exclusively for preferred and/or recommended vendors. In some embodiments, the exchange system 502 may have a central repository that stores a job record for the job. For example, the exchange system 502 may have a database storing the job record as described above with reference to FIG. 1.

In some embodiments, the exchange system 502 may further limit which user(s) can access a job for a time period (e.g., one day, two day, a week, a month, etc.). The exchange system 502 may limit access to a job to preferred and/or recommended vendors for a time period, and thereafter allow access to other vendors. For example, the exchange system 502 may limit the job from being displayed in a user interface of vendors who are not preferred and/or recommended while displaying the job in a user interface of vendors who are preferred and/or recommended. In some embodiments, the exchange system 502 may store permissions for various vendors (e.g., staffing firm(s), recruiter(s)) in a database of the exchange system 502. The exchange system 502 may use the stored permissions to determine which vendors have access to a given job. According to one embodiment, at block 512, a user may find the job after the period of time (e.g., after two days). The period of time may, for example, be referred to as an exclusive period.

Thereafter, at blocks 514-516, the user of the staffing firm system 504 may review listing details for that particular job. The user may, for example save the job, and work on finding candidates for the job. In some embodiments, the use may search a staffing system 504 for possible candidates. The staffing system 504 may comprise an application tracking system (ATS) used for tracking candidate records. At block 518, the staffing firm may also submit one or more candidates to be considered. In some embodiments, when the staffing system 504 submits a candidate to the job, at block 520, and the exchange consultant can review the new listing via the consultant system 503. In one example, the consultant system 503 may permit the consultant to review the resume at block 522. The exchange system 502 may, for example, provide the consultant 503 a user interface via which to view the resume. In some embodiments, the consultant 503 may further ask questions at block 524 via the consultant system. In some embodiments, the consultant system 503 may transmit questions submitted via the scout consultant system 503 to the staffing firm system 504. At block 525, the staffing firm (e.g., a recruiter of the staffing firm) may respond to questions received about the candidate.

In some embodiments, when the exchange system 502 receives a candidate submission, the exchange system 502 may match a stored worker record (e.g., a temporary worker record 103) to the job. For example, the exchange system 502 may have previously stored a worker record associated with the candidate when the exchange system 502 received the candidate in an earlier submission, or a staffing firm user had entered information about the candidate. When the exchange system 502 receives a submission of the same candidate for the current job, the exchange system 502 may store the submission of a worker from a stored pool of workers. The stored pool of workers may be associated with the staffing firm 504. In one instance, where a worker record does not exist for a submitted candidate, the exchange system 502 may generate and store a worker record in a database of the exchange system (e.g., worker database 104), for use in subsequent submissions of the worker to other jobs. Further, the exchange system 502 may further store the worker record in a pool (e.g., pool 102). In some embodiments, the exchange system 502 may associate the pool with a staffing firm that submitted workers stored in the pool.

After screening the resume at block 522, the consultant may further disposition a candidate 526. In some embodiments, the consultant may disposition the candidate by indicating whether the candidate is of interest to the consultant to fill in the job. If the candidate is interesting to the consultant, or otherwise passes any certifications or requirements for the position, the exchange consultant can submit the candidate to the exchange system 502 at block 528. If, however, the consultant submits that the candidate is not of interest for the job, the consultant may mark the candidate not interested at block 530. In some embodiments, the exchange system 502 may update a candidate record associated with the candidate to store an indication that the candidate is not of interest for a particular job. In some embodiments, at block 532, the staffing firm may receive an indication that the candidate has been rejected. For example, a recruiter(s) may receive an email indicating that the candidate has been rejected for the job. In another example, the exchange system 502 may transmit a message to the staffing system 504 indicating that the candidate is not of interest for the job. The staffing firm system 504 may display an alert to a recruiter(s) indicating the rejection.

At block 528, the consultant may submit the candidate for the job. In one embodiment, the exchange is capable of determining whether there is a duplicate candidate defined within the system. According to some embodiments, the exchange system 502 may determine whether a duplicate candidate exists in the exchange system 502 at block 534 when the candidate is submitted for the job. In online hiring systems, often times multiple staffing firms (e.g., multiple recruiter) may submit identical candidates for a job. Accordingly, conventional systems are unable to determine which recruiter to associate with the candidate. For example, conventional systems are unable to determine which recruiter is to be contacted regarding the candidate, and which recruiter is to be paid in the event of candidate hiring. According to one aspect of the present invention, the system eliminates the possibility of duplicate candidates, as it is determined that only particular staffing firms may be paid for a particular placement. According to one aspect, the first entity that posts the candidate for particular position receives the financial benefit. According to some embodiments, the exchange system 502 maintains a candidate record for candidates submitted to various jobs. The exchange system 502 may store a mapping of the candidate to a particular recruiter and/or job record in the database. Accordingly, the exchange system 502 may determine whether the candidate is a duplicate candidate for the job by checking stored mappings in a database of the exchange system 502.

If, at block 534, the exchange system 502 determines that the candidate is not a duplicate candidate, the exchange system 502 may proceed to block 536 where the system 502 imports the candidate to the employer ATS 501 at block 536. In some embodiments, the exchange system 502 may retrieve a candidate record from the scout consultant system 503 and import the candidate record to the employer ATS 501. If, at block 534, the exchange system 502 determines that the candidate is a duplicate candidate, the exchange system 502 may proceed to block 538 where it determines whether to overwrite the candidate in the employer ATS 501. In some embodiments, the exchange system 502 may request a consultant to provide input as to whether the candidate is to be overwritten in the employer ATS 501. In some embodiments, the exchange interface 502 may generate a user interface screen via which the consultant can input whether to overwrite the candidate. If, at block 538, the exchange system 502 received input indicating to not overwrite the candidate in the ATS 501, then the candidate may be marked as not interested at block 530 and a rejection notification may be transmitted to a recruiter or submitted the candidate at block 532. If, at block 538, the exchange system 502 receives input indicating to overwrite the candidate in the ATS 501, then the candidate may be imported at block 536 and replace an existing candidate stored in the system. In some embodiments, the exchange system 502 may replace a candidate record stored in a database of the exchange system 502 with a new candidate record of the submitted candidate record. In another embodiment, the exchange system 502 may update fields in the candidate record based on information from the candidate submission.

If the exchange system 502 determines that the candidate is unique or the exchange system 502 receives instructions to overwrite an existing candidate, the exchange system 502 may permit the consultant to contact the employer and schedule interviews at block 540. According to one aspect of the present invention, direct links into the employer's ATS 501 system is provided, and the candidate can be moved through an ATS 501 workflow at bock 542 in the employer system 501. If, in the employer ATS system 501 the candidate is hired, the ATS system 501 may contact the exchange system 502 to indicate the hiring. In some embodiments, the exchange system 502 may receive a message from the employer ATS system 501 indicating that the candidate has been hired. In some embodiments, in response to receiving the indication, the exchange system 502 may start a placement handshake as discussed further below with reference to FIG. 6.

In some embodiments, as shown at block 548, the exchange system 502 may transmit an indication to the staffing firm to start the placement handshake. For example, the exchange system 502 may transmit a message to the staffing firm system 504 to initiate the handshake. If the applicant is not accepted at block 544, an indication is sent to the staffing firm to identify the candidate as rejected. In some embodiments, the exchange system 502, at block 550, may receive an indication (e.g., a message) from the employer ATS system 501 about the rejection. In response, the exchange system 502 may update a candidate record of the candidate to indicate that the candidate has been rejected. For example, the exchange system 502 may update a field in the candidate record stored in a database of the exchange system 502. The exchange system 502 may further transmit a notification to the staffing firm 504 about the change in candidate status at block 552. In some embodiments, the exchange system 502 may automatically trigger a notification sent to a staffing firm system 504. In some embodiments, the exchange system 502 may additionally and/or alternatively transmit an email to a user (e.g., a recruiter) about the candidate status.

FIGS. 13A-B illustrates example user interfaces for placing a candidate into a position. FIG. 13A illustrates an example screen 1300 via which a staffing firm (e.g., a recruiter) may submit a candidate for a job requisition. The staffing firm may enter information about the worker such as worker name, company name, email address, job title, job requisition ID, and other information. The exchange system may generate a candidate record using information submitted via the user interface screen 1300. FIG. 13B illustrates an example user interface screen 1310 which the employer may use to review a worker. The exchange system may generate the user interface screen 1310 to allow the employer to review a candidate and determine to accept a candidate for placement.

Figure 6A:
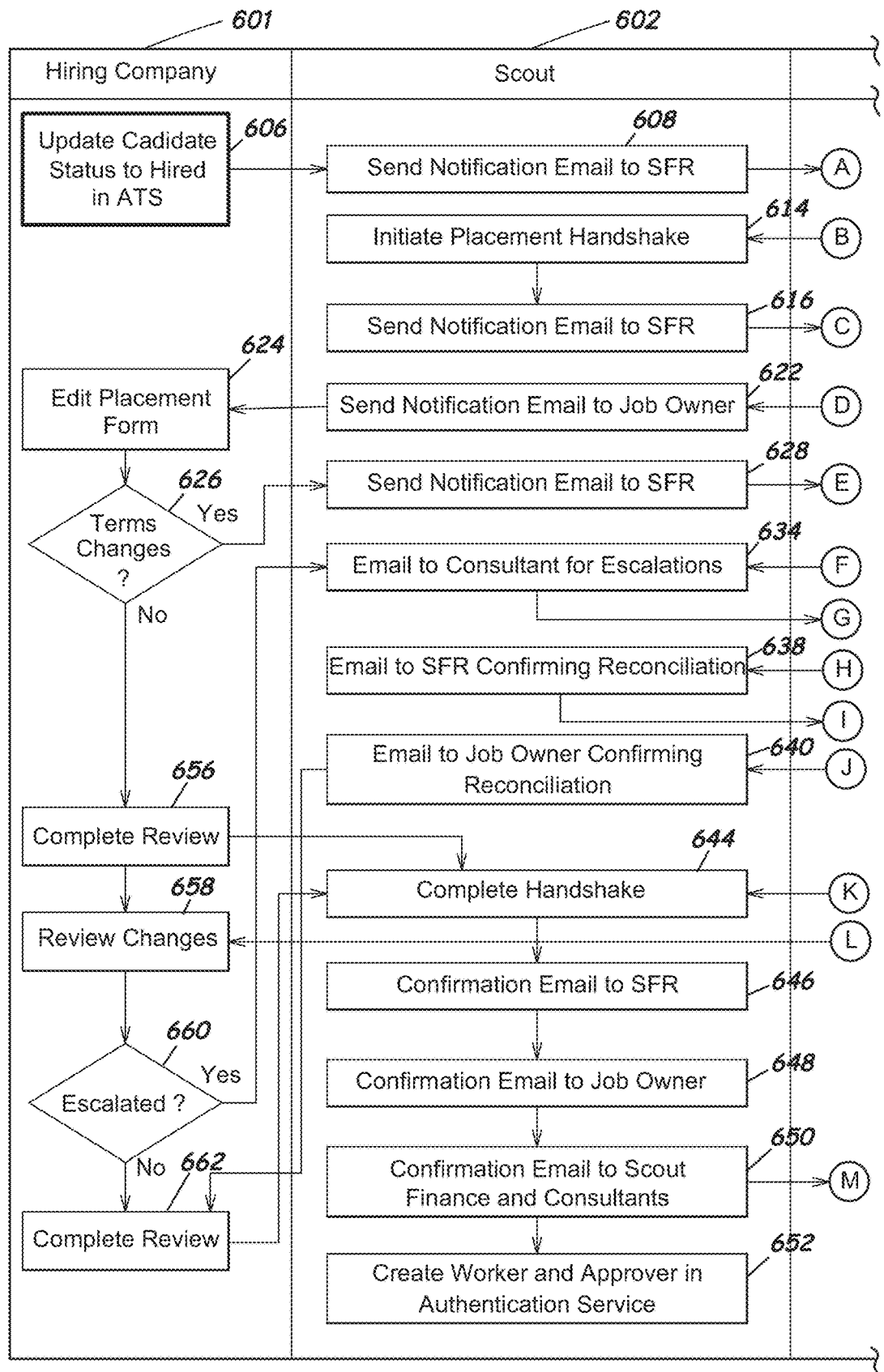
FIGS. 6A-B show another example detailed process for performing a placement handshake among multiple systems according various aspects of the present invention.
Figure 6B:
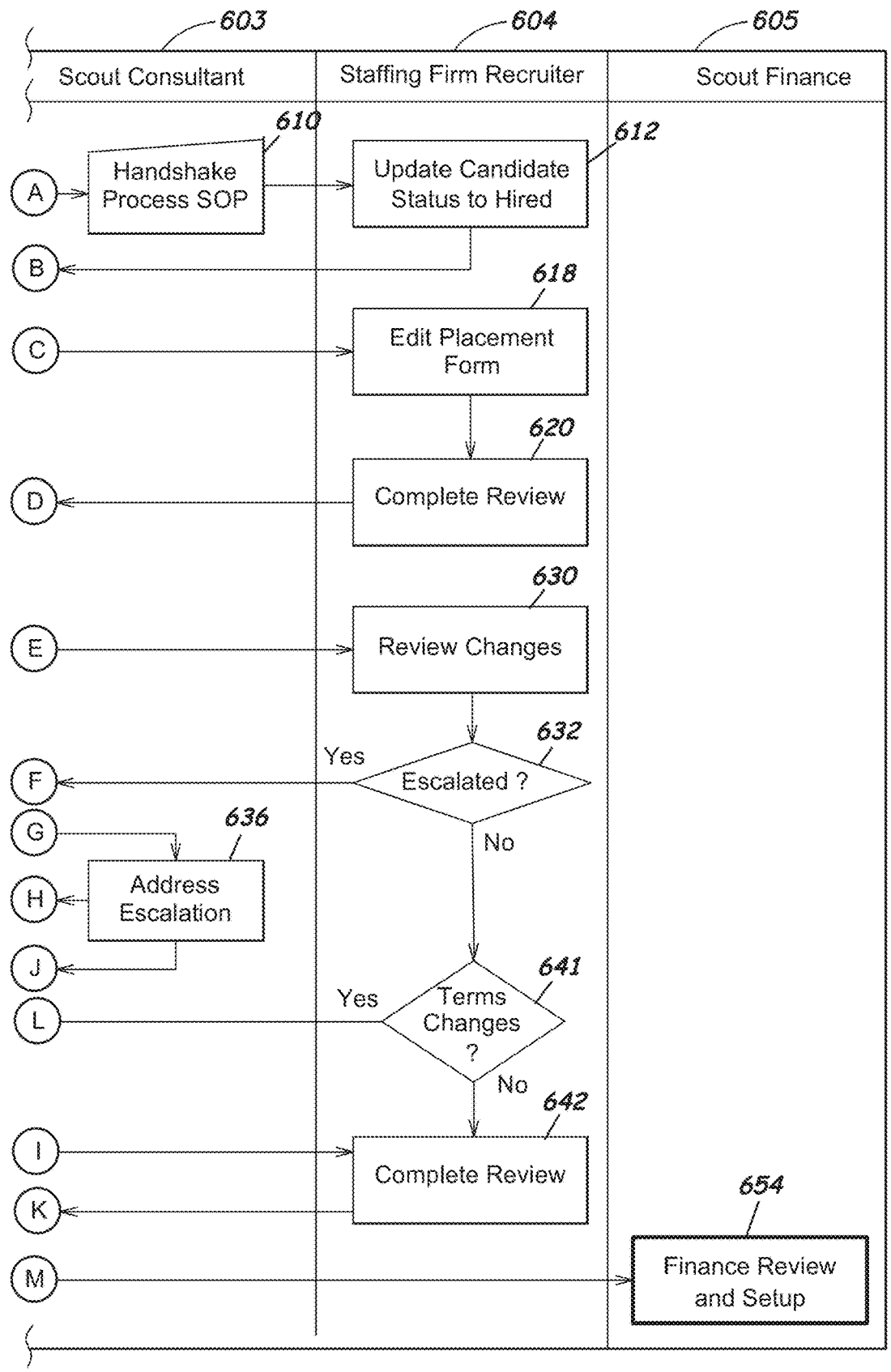

FIG. 6 (FIGS. 6A-6B) shows an example process 600 for performing a placement handshake among multiple systems according various aspects of the present invention. In particular, FIGS. 6A-6B show processes involving interaction between an applicant tracking system (ATS) 601 at a hiring company (e.g., an employer of the candidate), an exchange system 602 (e.g., scout exchange system 101), a scout consultant system 603, a staffing firm system 604, and an exchange finance system 605 (e.g., scout finance).

Within the ATS, at block 606 the hiring company 601 may update the candidate status to hired, and then a connector within the ATS system communicates with the exchange system 602. In one implementation, at block 608 the exchange system 602 may send a notification email to a scout consultant system to initiate the hiring handshake process. In some embodiments, the exchange system 602 may send the email in response to receiving the updated candidate hired status from the hiring company ATS 601. In some embodiments, the exchange system 602 may, at block 610, perform a handshake with the scout consultant system 603 which may then transmit a candidate status update to the staffing firm system 604. In some embodiments, the exchange system 602 may update a candidate status in the staffing firm system 604 to indicate that the candidate status is hired, and the placement handshake is initiated at block 614. For example, in response to updating the candidate status to hired in the staffing computer system, the exchange system 602 may automatically initiate the placement handshake at block 614.

At block 616, the exchange system 602 may transmit a notification (e.g., an email) to the staffing firm (e.g., a recruiter of the staffing firm). In some embodiments, the notification may include a placement form. At blocks 618-620, the staffing firm recruiter (SFR) edits a placement form, and completes the review. In some embodiments, the exchange system 602 sends a notification (e.g., an email) to the hiring company (e.g., the job owner) at block 622. According to some embodiments, the exchange system 602 may send the notification responsive to the SFR completing the review. Thereafter, the hiring company may further edit the candidate placement form at block 624. If the terms have not changed, the review is completed and the handshake is completed. However, if any of the terms have changed notifications may be sent back and forth to coordinate agreement of the terms.

In some embodiments, at block 626, the hiring company may make changes to the terms. If changes are made to the terms of the placement, the exchange system 602 may receive an indication of the change at block 628. In response, the exchange system 602 may transmit a notification to the staffing firm (e.g., a recruiter) of the changed terms. In some embodiments, the exchange system 602 may transmit an alert notification to the recruiter in a user interface presented to the recruiter by the exchange system 602. At block 630, upon receiving the changed terms, the staffing firm may review the changes in the terms. According to one aspect, the system may include controls to contact a consultant for escalation. The recruiter may further determine to escalate the changes at block 632. If the changes are escalated at block 632, the exchange system 602 may receive an indication of the escalation (e.g., a message) and, in response, transmit a notification (e.g., an email) to a consultant to escalate at block 634. At block 636, the consultant may address the escalation. In some embodiments, the consultant may receive a notification of the escalation in a user interface of the exchange system 602 presented to the consultant. The consultant may address the escalation via the user interface.

When the consultant has addressed the escalation at block 636, the exchange system 602 may receive an indication of the escalation having been addressed. In some embodiments, the exchange system 602 may receive the indication responsive to a consultant entering information into a user interface (e.g., of a webpage or application). The exchange system 602 may, at block 638 transmit a notification (e.g., an email) to the staffing firm recruiter of the reconciliation. Upon receiving the reconciliation, the recruiter may complete the review at block 642. The exchange system may additionally and/or alternatively, at block 640, transmit a notification (e.g., an email) to the job owner confirming the reconciliation at block 640. The job owner may further complete the review at block 662. Upon both the staffing firm and the job owner completing the review, the exchange system at block 644 may complete the handshake.

Returning again to block 632, if the staffing firm recruiter decides to not escalate the changes provided by the job owner at block 626, the staffing firm recruiter may determine to make further term changes at block 641. If the recruiter decides to not make further changes to the terms at block 641, then the recruiter may complete the recruiter's review at block 642. If, however, the recruiter determines to make changes to the terms at block 641, the exchange system 602 may transmit a notification of the changes to the job owner. For example, the exchange system 602 may receive a notification of changed terms from the staffing firm. In response, the exchange system 602 may automatically transmit a notification (e.g., an email) to the job owner to review the changes. At block 658, the job owner may review the changes submitted by the recruiter. The job owner, at block 660, may determine whether to escalate the matter. If the job owner decides to escalate at block 660, then the process may proceed to block 634 to initiate the escalation process described above. If, however, the job owner decides to not escalate at block 660, the job owner may complete the review at 662. The process may then proceed to block 644 where the exchange system 602 completes the handshake.

Returning again to block 644, where the exchange system 602 completes the handshake, according to some embodiments, the exchange system 602 may update a handshake status stored in a database of the exchange system 602. In some embodiments, upon completion of the handshake status, the exchange system 602 may further send notifications (e.g., emails) to parties involved in the placement. In some embodiments, as shown in blocks 646-650, the exchange system 602 may transmit notifications to the recruiter (block 646), the job owner (block 648), and/or to scout finance and consultants (block 650). In some embodiments, upon completion of the handshake, the exchange system 602 may additionally transmit a notification to a finance system 605 for reviewing and setting up payments. In some embodiments, the finance system may comprise a component of the exchange system 602 that manages and performs the finance review and setup processes. If the terms are agreed to, the contact is made to a final financial review and set up of the candidate in the system, and a worker role and approver role is created within the authentication service. Thereafter, a worker may be permitted to create and edit timesheets, and the approver may be capable of approving timesheets for payment. In some embodiments, as shown at block 652, the exchange system 602 may further create a worker and approver in an authentication service. In some embodiments, the exchange system 602 may store a new worker and approver role in a database of the exchange system 602. The exchange system 602 may, for example, allow the worker to create and edit timesheets, and allow the approver to, for example, approve timesheets for payment. An example interaction between various systems according to embodiments of the technology described herein is discussed below with reference to FIGS. 7A-B.

Figure 7A:
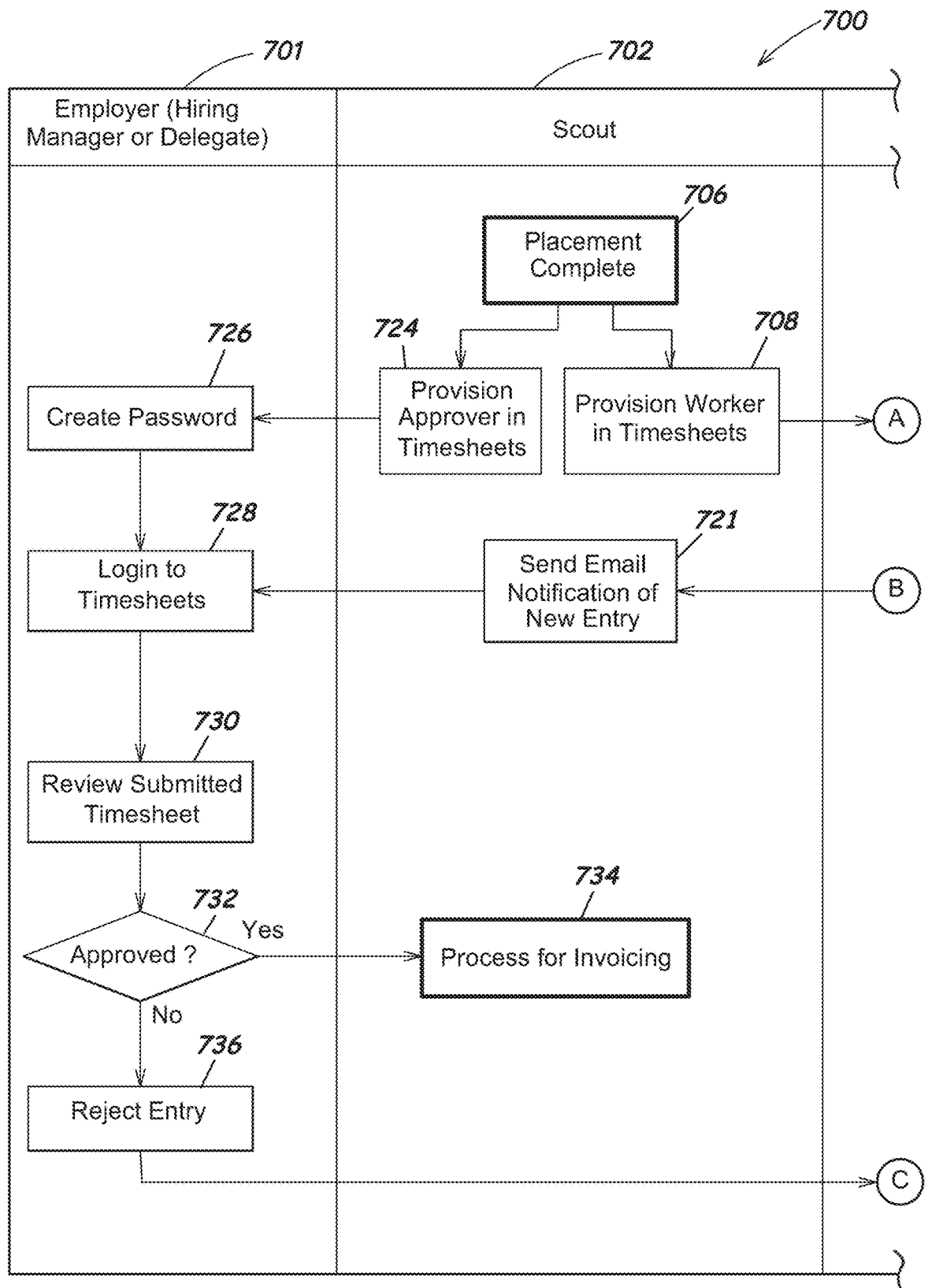
FIGS. 7A-B show an example process for handling and approving timesheets among multiple systems according to various aspects of the present invention.
Figure 7B:
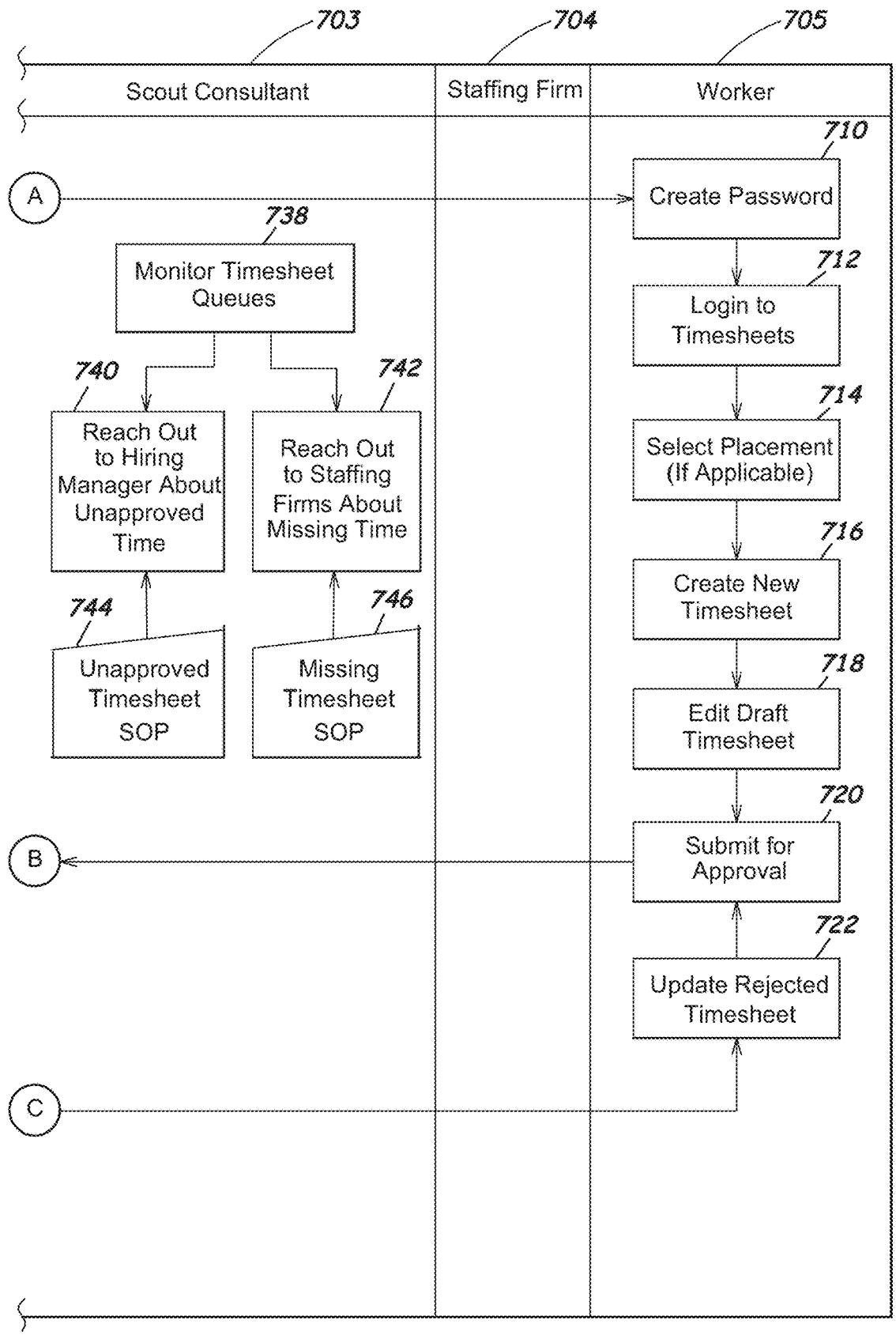

FIG. 7 (FIGS. 7A-7B) shows an example process 700 for handling and approving timesheets among multiple systems according to various aspects of the present invention. In particular, FIGS. 7A-7B show processes involving interaction between an employer system 701 (e.g., operated by a hiring manager or delegate), an exchange system 702 (e.g., exchange system 101), a scout consultant system 703, a staffing firm system 704, and a worker system 705.

After a placement is complete at block 706, the exchange system 702 may provision an approver in a timesheets application at block 724. In some embodiments, the exchange system may generate a new record, or access an existing record associated with the approver in a database 702. The exchange system 702 may update the record to reflect that a user has been assigned as an approver. For example, the exchange system 702 may assign a user an "approver" role in the record associated with the user. Further, the exchange system 702 may provision the worker within the timesheets application at block 708. In some embodiments, the exchange system 702 may update a stored record in a database of the exchange system 702 to provision the worker. For example, the exchange system 702 may assign a user a "worker" role in a record associated with the user to provision the worker in time sheets.

In some embodiments, the exchange system 702 may transmit a notification of provisioning the approver to the employer system 701. In some embodiments, the exchange system 702 may transmit a notification (e.g., an email, an alert in an interface). When an approver (e.g., a hiring manager or a delegate) has been provisioned, the approver may create a login (e.g., a username) for a timesheets application at block 726. The approver may access the timesheets application via the employer system 701. The worker may also create a password and login to the timesheets application at block 726. At block 728, the approver may use the login to sign into the timesheets application.

In some embodiments, the exchange system 702 may include the timesheets application. The timesheets application may, for example, comprise a component of the exchange system 702. In other embodiments, the timesheet application may comprise a separate system executing on a separate computer system.

According to some embodiments, the worker, once provisioned, may also create a login (e.g., username, password) for the timesheets application at block 710. The worker may use the login created at block 710 to log into the timesheet application at block 712. Upon logging in, the worker may select a placement at block 714. For example, if the worker has been placed for multiple job listings, the worker may have an option to select a specific placement. At blocks 716-720, the worker create a new timesheet edit it, submit it for approval through the exchange system 702. According to some embodiments, the exchange system 702, upon receiving a submission of a timesheet, may automatically transmit the timesheet to the employer system 701 for review. For example, the exchange system 702 may receive a submission of the timesheet via a user interface of the timesheet application (e.g., a webpage, screen of an application). In response, the exchange system 702 may transmit the timesheet to the employer system 701 and allow the employer system 701 to view the timesheet in a user interface of the timesheet application. In some embodiments, as shown at block 721, the exchange system 702 may transmit a notification of a submitted timesheet. For example, in response to receiving a timesheet submission, the exchange system 702 may transmit an email to the approver and/or a notification to the employer system 701 (e.g., alert in a user interface).

At block 730, the approver may review a submitted timesheet. For example, the approver may view the timesheet in a user interface of the timesheet application. The user interface may provide an option to approve the timesheet. If, at block 732, the approver approves a submitted timesheet, the exchange system 702 may perform an invoicing process using the timesheet at block 734. In some embodiments, upon approval of a timesheet, the exchange system 702 may receive a notification of the approval. The exchange system 702 may, in response, perform a process of invoicing using the submitted timesheet. If, at block 732, the approver rejects a submitted timesheet, the worker may be required to update the rejected timesheet at block 722. In some embodiments, the exchange system 702 may transmit a notification to the worker system 705 informing the worker that the timesheet is to be updated. For example, the exchange system 702 may transmit an email to the worker and/or generate an indication in a user interface of the timesheet application informing the worker that the timesheet is to be updated. The worker may then update the timesheet at block 722 and then submit the timesheet for approval at block 720 as described above.

In some embodiments, the exchange system 702 may provide various monitoring functions to the scout consultant system 703. Consultants may use the functions to monitor timesheet submission, approval, and/or accuracy. At block 738, the consultant may monitor timesheet queues 738. For example, the exchange system 702 may present the consultant system 703 with a queue of timesheets submitted by a worker(s). In some embodiments, the consultant system 703 may further receive a notification of unapproved timesheets as shown at block 744. At block 740, the consultant may reach out to an employer user (e.g., a hiring manager) about unapproved time. In some embodiments, the exchange system 702 may provide the consultant with an option to notify the hiring manager of the unapproved timesheet. As shown at block 746, the consultant system may receive a notification of a missing timesheet submission. For example, a worker may not have submitted a timesheet after having started working for the employer. At block 742, the consultant may reach out to a staffing firm (e.g., a recruiter) associated with the worker. The consultant may, for example, remind the firm to acquire a timesheet submission. In some embodiments, the exchange system 702 may provide the consultant system 703 an option to notify a staffing system of the missing time.

FIGS. 14A-B illustrate exemplary user interface screens of a timesheet application in accordance with some embodiments of the technology described herein. FIG. 14A illustrates a user interface screen 1400 that a worker may create, access, edit, and submit. The worker may enter, for example, an amount of time worked, date of work, time in, time out, and other information. The worker may then submit the entered time which may be sent to an approver for review. FIG. 14B illustrates a user interface screen 1410 that may be viewed by the approver. The approver may, for example, see a plurality of timesheet submissions submitted by one or more workers. The approver may select to reject or approve each timesheet submission.

Figure 8A:
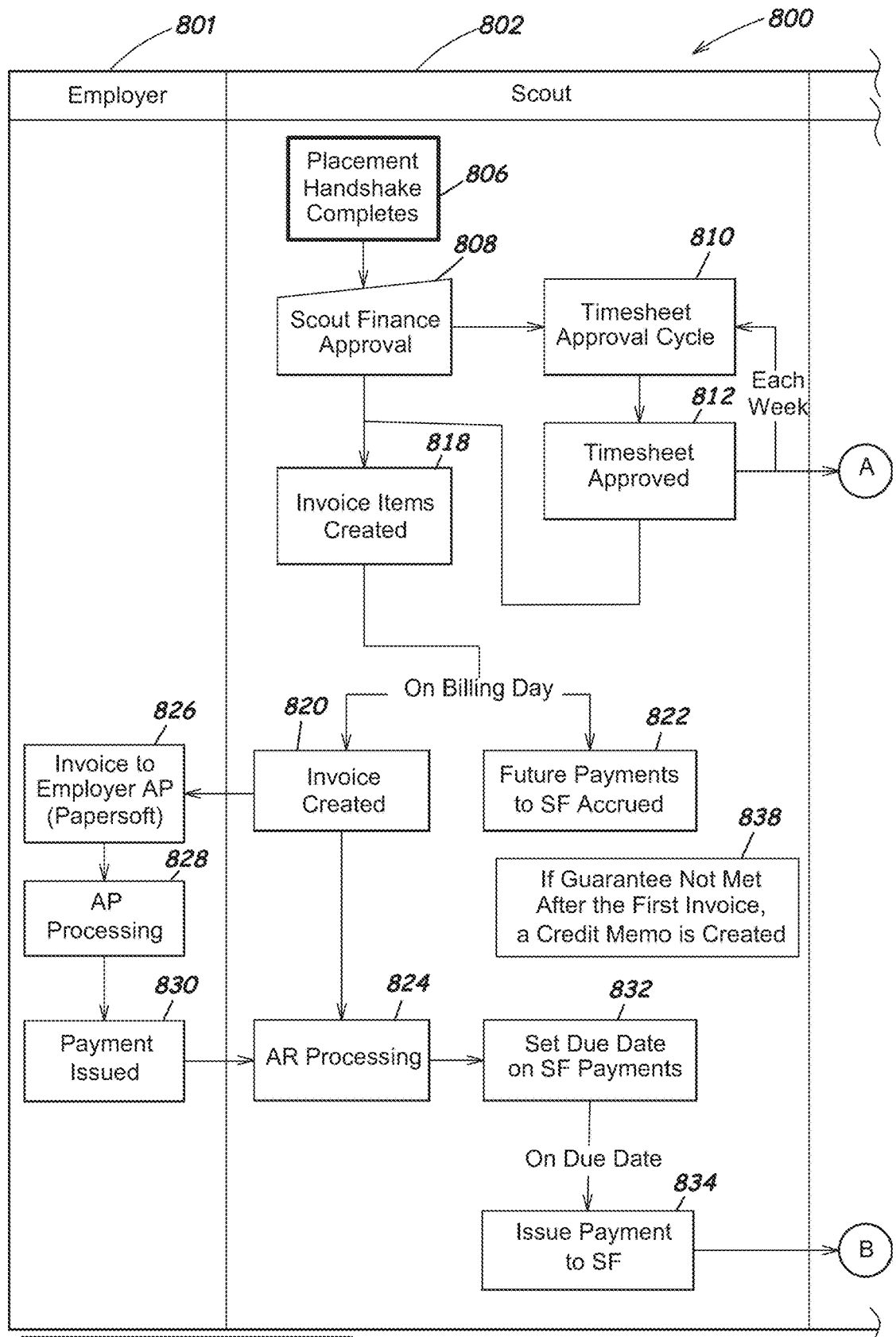
FIGS. 8A-B show an example process for performing invoicing and payments among multiple systems in association with temporary workers according to one embodiment of the present invention.
Figure 8B:
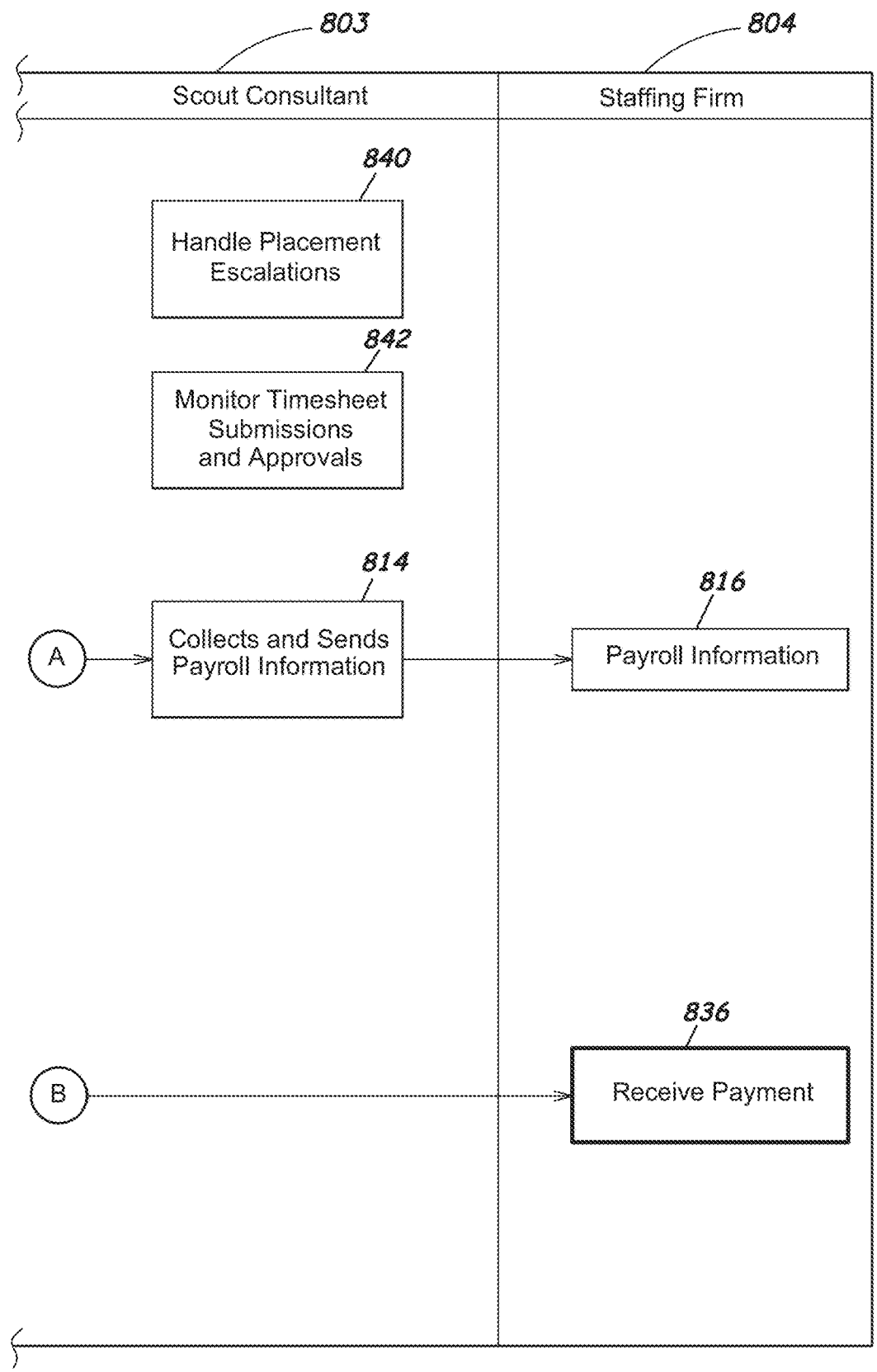

FIG. 8 shows an example process 800 for performing invoicing and payments among multiple systems in association with a worker (e.g., a temporary worker) according to one embodiment of the present invention. In particular, FIGS. 8A-8B show processes involving interaction between an employer system 801 at an employer of the candidate, an exchange system 802 (e.g., scout), a scout consultant system 803, and a staffing firm system 804.

The process 800 may be performed when a placement handshake is completed at block 806. The handshake may, for example, be performed as described above with reference to FIG. 6. At block 808, the exchange system 802 may contact a finance system is contacted for approval. Upon receiving approval from the finance system, the exchange system 802 may initiate the timesheet approval process (e.g., process 700 described above with reference to FIG. 7). Thereafter, one or more timesheets may be entered and approved at block 812, and one or more invoices may be created.

In some embodiments, the exchange system 802 may collect information received from submission of timesheets. For example, the exchange system 802 may collect payroll information based on the timesheets. The exchange system 802 may transmit the payroll information to the consultant system 803. The consultant system 803 may, at block 814, collect the payroll information and send it to the staffing firm system 804. At block 816, the staffing firm may receive the payroll information.

At block 818, the exchange system 802 may use approved timesheets to generate invoice items. Invoice items may comprise information (e.g., data related to time worked, date worked, and other information) that is to be used for generating an invoice. At block 820, the exchange system 802 may generate an invoice(s). Such invoices may be created periodically by the exchange system 802 based on approved timesheets that are entered within the system. For example, on a particular billing day, the exchange system 802 may generate an invoice. At block 826, the exchange system 802 may transmit a generated invoice to an employer for processing. For example, the exchange system 802 may transmit the generated invoice to an automatic payment (AP) system. The employer may process the payment at block 828 and then issue the payment at block 830.

When a payment has been issued at block 830, according to some embodiments, the exchange system 802 may receive a notification of the issued payment. In some embodiments, the exchange system 802, at block 824, may automatically route (AR) payment to one or more parties involved with a candidate placement (e.g., staffing firm, recruiter, exchange system manager). In some embodiments, once payment is issued, the exchange system 802 may issue payment to one or more staffing firms automatically. In some embodiments, as shown at block 832, the exchange system 802 may set a due date(s) for staffing firm payment(s). The exchange system 802 may determine whether a current time matches a due date. When the current time matches the due date, the exchange system 802 may trigger transmission of payment to a staffing firm at block 834. At block 836, the staffing firm may receive the payment. In one example, the exchange system 802 may automatically initiate a transfer of funds to an account of the staffing firm.

In some embodiments, the exchange system 803 may further enable a consultant to perform various functions. For example, exchange consultant may perform operations such as handling placement escalations as shown at block 840. The consultant may, for example, determine whether to escalate a placement as a result of disagreement of terms between placement parties (e.g., employer and worker). After placement, the consultant may monitor timesheet submissions and approvals. The exchange system 802 may, for example, provide a user with a queue of submitted timesheets from one or more worker(s) (e.g., in a user interface generated by the exchange system 802). The exchange system 802 may generate a user interface displaying a status (e.g., approved, unapproved) of submitted timesheets, date of submission, and/or other information about timesheets. In some embodiments, the exchange system 802 may update the information responsive to user actions (e.g., submission by a worker and/or approval by a hiring manager). The consultant may use the information to monitor the timesheet approvals and submissions.

The inventors have recognized and appreciated that the process of distributing payments to one or more entities involved with placement of a candidate is made more efficient as direct system to system contact communicates payment to the entities. For example, as described above in process 800 with reference to FIG. 8, the exchange system can automatically distribute payments to the staffing firm. The exchange system, by integrating interaction between the multiple entities, allows for management of timesheet submission, timesheet approval, and payment distribution. Further, the exchange system enables various functions to be performed immediately responsive to user actions. For example, payment distributions to staffing firms can be performed responsive to receipt of payment from an employer.

Although the scout consultant system is shown separately in FIGS. 4-8 above, embodiments are not limited in this manner. According to some embodiments, the scout consultant system may comprise a component of the exchange system. In other embodiments, the scout consultant system may comprise a separate system communicatively coupled to the exchange system.

Various aspects and functions described herein may be implemented as specialized hardware or software components executing in one or more specialized computer systems. There are many examples of computer systems that are currently in use that could be specially programmed or specially configured. These examples include, among others, network appliances, personal computers, workstations, mainframes, networked clients, servers, media servers, application servers, database servers, and web servers. Other examples of computer systems may include mobile computing devices (e.g., smart phones, tablet computers, and personal digital assistants) and network equipment (e.g., load balancers, routers, and switches). Examples of particular models of mobile computing devices include iPhones, iPads, and iPod Touches running iOS operating systems available from Apple, Android devices like Samsung Galaxy Series, LG Nexus, and Motorola Droid X, Blackberry devices available from Blackberry Limited, and Windows Phone devices. Further, aspects may be located on a single computer system or may be distributed among a plurality of computer systems connected to one or more communications networks.

Figure 15:
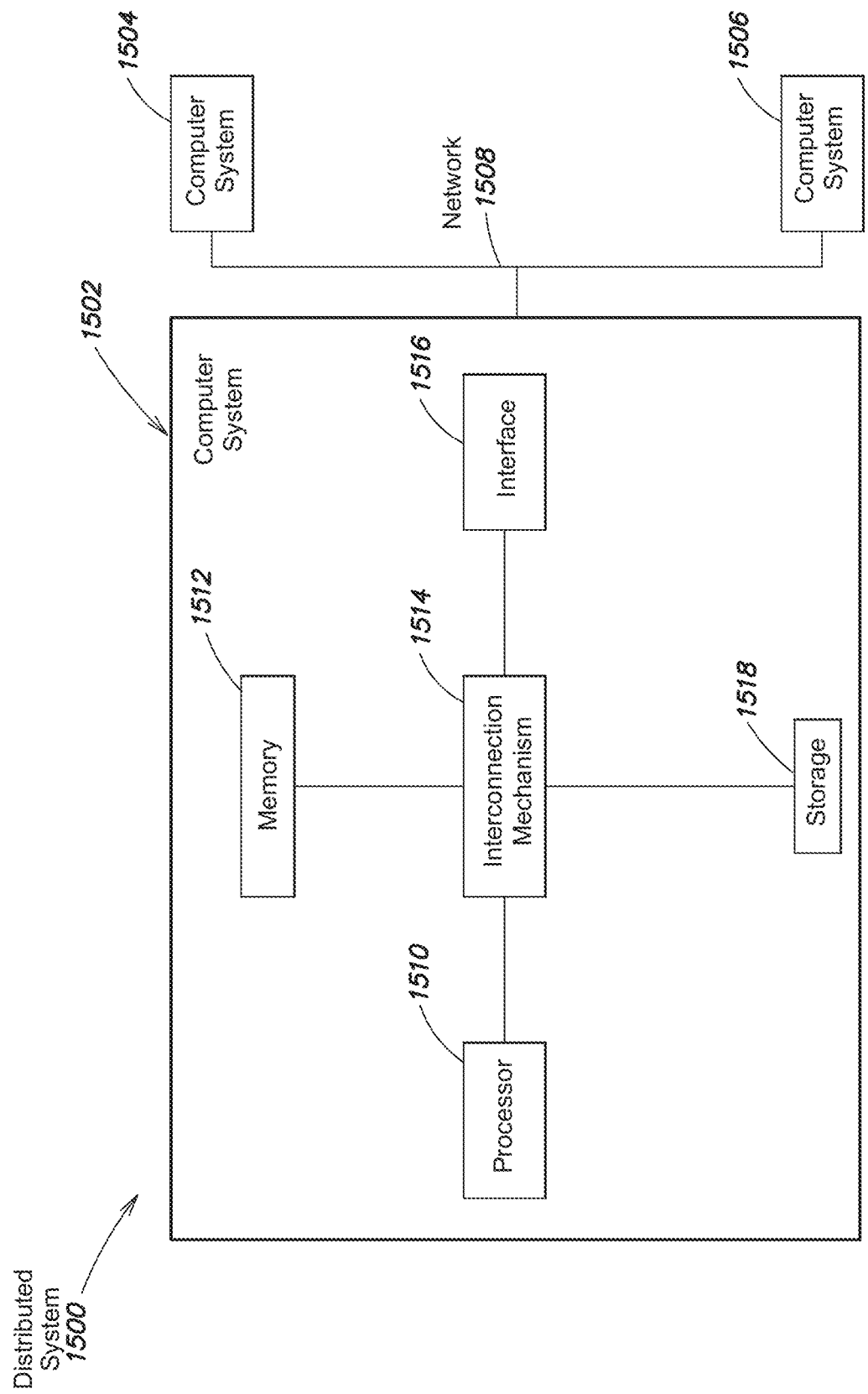
FIG. 15 is a schematic diagram of an exemplary computer system that may be specially configured to perform processes and functions disclosed herein.

For example, various aspects, functions, and processes may be distributed among one or more computer systems configured to provide a service to one or more client computers, or to perform an overall task as part of a distributed system, such as the distributed computer system 1500 shown in FIG. 15. Additionally, aspects may be performed on a client-server or multi-tier system that includes components distributed among one or more server systems that perform various functions. Consequently, embodiments are not limited to executing on any particular system or group of systems. Further, aspects, functions, and processes may be implemented in software, hardware or firmware, or any combination thereof. Thus, aspects, functions, and processes may be implemented within methods, acts, systems, system elements and components using a variety of hardware and software configurations, and examples are not limited to any particular distributed architecture, network, or communication protocol.

Referring to FIG. 15, there is illustrated a block diagram of a distributed computer system 1500, in which various aspects and functions are practiced. As shown, the distributed computer system 1500 includes one or more computer systems that exchange information. More specifically, the distributed computer system 1500 includes computer systems 1502, 1504, and 1506. As shown, the computer systems 1502, 1504, and 1506 are interconnected by, and may exchange data through, a communication network 1508. The network 1508 may include any communication network through which computer systems may exchange data. To exchange data using the network 1508, the computer systems 1502, 1504, and 1506 and the network 1508 may use various methods, protocols and standards, including, among others, Fiber Channel, Token Ring, Ethernet, Wireless Ethernet, Bluetooth, IP, IPV6, TCP/IP, UDP, DTN, HTTP, FTP, SNMP, SMS, MMS, SS15, JSON, SOAP, CORBA, REST, and Web Services. To ensure data transfer is secure, the computer systems 1502, 1504, and 1506 may transmit data via the network 1508 using a variety of security measures including, for example, SSL or VPN technologies. While the distributed computer system 1500 illustrates three networked computer systems, the distributed computer system 1500 is not so limited and may include any number of computer systems and computing devices, networked using any medium and communication protocol.

As illustrated in FIG. 15, the computer system 1502 includes a processor 1510, a memory 1512, an interconnection element 1514, an interface 1516 and data storage element 1518. To implement at least some of the aspects, functions, and processes disclosed herein, the processor 1510 performs a series of instructions that result in manipulated data. The processor 1510 may be any type of processor, multiprocessor or controller. Example processors may include a commercially available processor such as an Intel Xeon, Itanium, Core, Celeron, or Pentium processor; an AMD Opteron processor; an Apple A4 or A5 processor; a Sun UltraSPARC processor; an IBM Power5+ processor; an IBM mainframe chip; or a quantum computer. The processor 1510 is connected to other system components, including one or more memory devices 1512, by the interconnection element 1514.

The memory 1512 stores programs (e.g., sequences of instructions coded to be executable by the processor 1510) and data during operation of the computer system 1502. Thus, the memory 1512 may be a relatively high performance, volatile, random access memory such as a dynamic random access memory ("DRAM") or static memory ("SRAM"). However, the memory 1512 may include any device for storing data, such as a disk drive or other nonvolatile storage device. Various examples may organize the memory 1512 into particularized and, in some cases, unique structures to perform the functions disclosed herein. These data structures may be sized and organized to store values for particular data and types of data.

Components of the computer system 1502 are coupled by an interconnection element such as the interconnection element 1514. The interconnection element 1514 may include any communication coupling between system components such as one or more physical busses in conformance with specialized or standard computing bus technologies such as IDE, SCSI, PCI and InfiniBand. The interconnection element 1514 enables communications, including instructions and data, to be exchanged between system components of the computer system 1502.

The computer system 1502 also includes one or more interface devices 1516 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 1502 to exchange information and to communicate with external entities, such as users and other systems.

The data storage element 1518 includes a computer readable and writeable nonvolatile, or non-transitory, data storage medium in which instructions are stored that define a program or other object that is executed by the processor 1510. The data storage element 1518 also may include information that is recorded, on or in, the medium, and that is processed by the processor 1510 during execution of the program. More specifically, the information may be stored in one or more data structures specifically configured to conserve storage space or increase data exchange performance. The instructions may be persistently stored as encoded signals, and the instructions may cause the processor 1510 to perform any of the functions described herein. The medium may, for example, be optical disk, magnetic disk or flash memory, among others. In operation, the processor 1510 or some other controller causes data to be read from the nonvolatile recording medium into another memory, such as the memory 1512, that allows for faster access to the information by the processor 1510 than does the storage medium included in the data storage element 1518. The memory may be located in the data storage element 1518 or in the memory 1512, however, the processor 1510 manipulates the data within the memory, and then copies the data to the storage medium associated with the data storage element 1518 after processing is completed. A variety of components may manage data movement between the storage medium and other memory elements and examples are not limited to particular data management components. Further, examples are not limited to a particular memory system or data storage system.

Although the computer system 1502 is shown by way of example as one type of computer system upon which various aspects and functions may be practiced, aspects and functions are not limited to being implemented on the computer system 1502 as shown in FIG. 15. Various aspects and functions may be practiced on one or more computers having a different architectures or components than that shown in FIG. 15. For instance, the computer system 1502 may include specially programmed, special-purpose hardware, such as an application-specific integrated circuit ("ASIC") tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 1502 may be a computer system including an operating system that manages at least a portion of the hardware elements included in the computer system 1502. In some examples, a processor or controller, such as the processor 1510, executes an operating system. Examples of a particular operating system that may be executed include a Windows-based operating system, such as, the Windows-based operating systems, available from the Microsoft Corporation, a MAC OS System X operating system or an iOS operating system available from Apple Computer, one of many Linux-based operating system distributions, for example, the Enterprise Linux operating system available from Red Hat Inc., or a UNIX operating system available from various sources. Many other operating systems may be used, and examples are not limited to any particular operating system.

The processor 1510 and operating system together define a computer platform for which application programs in high-level programming languages are written. These component applications may be executable, intermediate, byte-code or interpreted code which communicates over a communication network, for example, the Internet, using a communication protocol, for example, TCP/IP. Similarly, aspects may be implemented using an object-oriented programming language, such as .Net, Java, C++, C# (C-Sharp), Python, or JavaScript. Other object-oriented programming languages may also be used. Alternatively, functional, scripting, or logical programming languages may be used.

Additionally, various aspects and functions may be implemented in a non-programmed environment. For example, documents created in HTML, XML or other formats, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements (e.g., specialized hardware, executable code, data structures or objects) that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user space application) or in a commonly shared data structure (such as an application registry that is defined by an operating system). In addition, some examples provide for both system and user interfaces that allow external entities to modify the parameters and thereby configure the behavior of the components.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

Various features and aspects of the present disclosure may be used alone, in any combination of two or more, or in a variety of arrangements not specifically discussed in the embodiments described in the foregoing and is therefore not limited in its application to the details and arrangement of components set forth in the foregoing description or illustrated in the drawings. For example, aspects descried in one embodiment may be combined in any manner with aspects described in other embodiments.

Also, the concepts disclosed herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of the ordinal terms such as "first," "second," "third," etc., in the claims to modify a claim element does not by itself connote any priority, precedence, or order of one claim element over another or the temporal or der in which acts of a method are performed, but are used merely as labels to distinguish one claim element having a certain name from another element having a same name (but for use of the ordinal term) to distinguish claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

What is claimed is:

1. A distributed computer system comprising:
a network interface configured to communicate with an employer computer sub-system, a plurality of staffing firm computer sub-systems each associated with a respective staffing firm, and a consultant computer sub-system;
a database configured to:
store a plurality of job requisition records each associated with a permission data indicating permission of the plurality of job requisition records to the plurality of staffing firm computer sub-systems; and
a plurality of temporary worker records; and
at least one processor configured to:
access, via the network interface, a job requisition record of the plurality of job requisition records in the database, the job requisition record being associated with a job requisition from the employer computer sub-system;
receive from the consultant computer sub-system, via the network interface, an indication of a user interaction indicating the job requisition record is exclusively available to a subset of the plurality of staffing firm computer sub-systems;
update the permission data associated with the job requisition record in the database based on the indication of the user interaction;
configure the database based on the permission data so that the job requisition record is accessible to the subset of the plurality of staffing firm computer sub-systems;
access, via the network interface, a submission of a candidate to the job requisition from a staffing firm computer sub-system of the subset of the plurality of staffing firm computer sub-systems;
receive, via the network interface, an indication of placement indicating that a placement of the candidate to the job requisition is complete from the employer computer sub-system;
in response to receiving the indication of placement indicating that the placement of the candidate is complete, update, in the database, a temporary worker record of the plurality of temporary worker records associated with the candidate that was placed, the temporary worker record indicating a staffing firm which placed the candidate;
receive from the employer computer sub-system, via the network interface, performance data associated with the candidate that was placed, the performance data indicating performance of the candidate that was placed; and
cause a payment sub-system to automatically send funds to an account of the staffing firm which placed the candidate based on the performance data and the temporary worker record associated with the candidate that was placed.

2. The distributed computer system of claim 1, wherein the at least one processor is further configured to receive the indication of placement indicating that the placement of the candidate is complete responsive to a status associated with the candidate in an applicant tracking system (ATS) used by the employer computer sub-system changing to hired.

3. The distributed computer system of claim 1, wherein the network interface is further configured to communicate with a worker computer sub-system associated with the candidate that was placed and an approver computer sub-system associated with an approver, and wherein the at least one processor is configured to:
receive, via the network interface, timesheet data associated with the candidate that was placed from the worker computer sub-system; and
transmit, via the network interface, the timesheet data to the approver computer sub-system.

4. The distributed computer system of claim 3, wherein the timesheet data includes an indication of a submitted timesheet from the worker computer sub-system.

5. The distributed computer system of claim 4, wherein the at least one processor is further configured to transmit the indication of the submitted timesheet to the approver computer sub-system.

6. The distributed computer system of claim 5, wherein the at least one processor is further configured to:
receive an indication of approval of the timesheet data by the approver from the approver computer sub-system associated with the approver; and
store the timesheet data in the database.

7. The distributed computer system of claim 5, wherein the at least one processor is further configured to:
receive, via the network interface, an indication of a rejection of the timesheet data by the approver from the approver computer sub-system; and
transmit, via the network interface, the indication of the rejection of the timesheet data to the worker computer sub-system.

8. The distributed computer system of claim 1, wherein the at least one processor is further configured to:
generate invoice data based on the performance data associated with the candidate that was placed, wherein the invoice data includes a link to timesheet data associated with the candidate that was placed; and
transmit, via the network interface, the invoice data to an automatic payment system associated with the employer computer sub-system.

9. The distributed computer system of claim 8, wherein the at least one processor is further configured to:
output or cause to output a representation of an invoice based on the invoice data, the representation of the invoice including a control input;
receive a user interaction indicating a selection of the control input; and
responsive to receiving the user interaction indicating the selection of the control input, retrieve or cause to retrieve the timesheet data associated with the candidate that was placed based on the link to the timesheet data.

10. The distributed computer system of claim 8, wherein the at least one processor is further configured to:
receive, via the network interface, a payment from the employer computer sub-system in response to transmitting the invoice data and before sending the funds to the account of the staffing firm associated with the staffing firm computer sub-system.

11. A computer-implemented method of integrating an employer computer sub-system, a plurality of staffing firm computer sub-systems and a consultant computer sub-system in a distributed computer system, the computer-implemented method comprising:
accessing, by at least one processor via a network interface, a job requisition record associated with a job requisition from the employer computer sub-system;

receiving from the consultant computer sub-system, via the network interface, an indication of a user interaction indicating the job requisition record is exclusively available to a subset of the plurality of staffing firm computer sub-systems;

updating permission data associated with the job requisition record in a database based on the indication of the user interaction;

configuring the database based on the permission data so that the job requisition record is accessible to the subset of the plurality of staffing firm computer sub-systems;

accessing, via the network interface, a submission of a candidate to the job requisition from a staffing firm computer sub-system of the subset of the plurality of staffing firm computer sub-systems;

receiving, by the at least one processor via the network interface, an indication that a placement of the candidate to the job requisition is complete from the employer computer sub-system;

in response to receiving the indication that the placement of the candidate is complete, updating, in the database, a temporary worker record of a plurality of temporary worker records in the database, the temporary worker record being associated with the candidate that was placed and indicating a staffing firm which placed the candidate;

receiving from the employer computer sub-system, via the network interface, performance data associated with the candidate that was placed, the performance data indicating performance of the candidate that was placed; and causing a payment sub-system to automatically send funds to an account of the staffing firm which placed the candidate based on the performance data and the temporary worker record associated with the candidate that was placed.

12. The computer-implemented method of claim 11, further comprising:

receiving, by the at least one processor via the network interface, timesheet data associated with the candidate that was placed from a worker computer sub-system associated with the candidate that was placed; and transmitting, by the at least one processor via the network interface, the timesheet data to an approver computer sub-system associated with an approver.

13. The computer-implemented method of claim 12, further comprising, by the at least one processor:

receiving, via the network interface, an indication of approval of the timesheet data by the approver from the approver computer sub-system; and storing the timesheet data in the database.

14. The computer-implemented method of claim 12, further comprising:

receiving, by the at least one processor via the network interface, an indication of a rejection of the timesheet data from the approver computer sub-system; and transmitting, by the at least one processor via the network interface, an indication of the rejection of the timesheet data to the worker computer sub-system.

15. The computer-implemented method of claim 11, further comprising, by the at least one processor:

generating invoice data based on the performance data associated with the candidate that was placed, wherein the invoice data includes a link to timesheet data associated with the candidate that was placed; and transmitting, via the network interface, the invoice data to an automatic payment system associated with the employer computer sub-system.

16. The computer-implemented method of claim 15, further comprising, by the at least one processor:

outputting or causing to output a representation of an invoice based on the invoice data, the representation of the invoice including a control input;

receiving a user interaction indicating a selection of the control input; and responsive to receiving the user interaction indicating the selection of the control input, retrieving or causing to retrieve the timesheet data associated with the candidate that was placed based on the link to the timesheet data.

17. The computer-implemented method of claim 15, further comprising:

receiving, by the at least one processor via the network interface, a payment from the employer computer sub-system in response to transmitting the invoice data and before sending the funds to the account of the staffing firm associated with the staffing firm computer sub-system.

18. A non-volatile computer-readable medium encoded with instructions for execution by at least one processor of a distributed computer system having a database, the instructions when executed, cause the at least one processor to perform a method, the method comprising:

accessing, by at least one processor via a network interface, a job requisition record associated with a job requisition from an employer computer sub-system;

receiving from an consultant computer sub-system, via the network interface, an indication of a user interaction indicating the job requisition record is exclusively available to a subset of a plurality of staffing firm computer sub-systems;

updating permission data associated with the job requisition record based on the indication of the user interaction;

configuring the database based on the permission data so that the job requisition record is accessible to the subset of the plurality of staffing firm computer sub-systems;

accessing, via the network interface, a submission of a candidate to the job requisition from a staffing firm computer sub-system of the subset of the plurality of staffing firm computer sub-systems;

receiving, by the at least one processor via the network interface, an indication that a placement of the candidate to the job requisition is complete from the employer computer sub-system;

in response to receiving the indication that the placement of the candidate is complete, updating, in the database, a temporary worker record of a plurality of temporary worker records in the database, the temporary worker record being associated with the candidate that was placed and indicating a staffing firm which placed the candidate;

receiving from the employer computer sub-system, via the network interface, performance data associated with the candidate that was placed, the performance data indicating performance of the candidate that was placed; and causing a payment sub-system to automatically send funds to an account of the staffing firm which placed the candidate based on the performance data and the temporary worker record associated with the candidate that was placed.

19. The non-volatile computer-readable medium of claim 18, wherein the method further comprises, by the at least one processor:
- generating invoice data based on the performance data associated with the candidate that was placed, wherein the invoice data includes a link to timesheet data associated with the candidate that was placed; and
- transmitting, via the network interface, the invoice data to an automatic payment system associated with the employer computer sub-system.

20. The non-volatile computer-readable medium of claim 19, wherein the method further comprises, by the at least one processor:
- outputting or causing to output a representation of an invoice based on the invoice data, the representation of the invoice including a control input;
- receiving a user interaction indicating a selection of the control input; and
- responsive to receiving the user interaction indicating the selection of the control input, retrieving or causing to retrieve the timesheet data associated with the candidate that was placed based on the link to the timesheet data.

* * * * *